United States Patent
Wu et al.

(10) Patent No.: US 12,051,912 B2
(45) Date of Patent: Jul. 30, 2024

(54) WIRELESS POWER TRANSMISSION SYSTEM

(71) Applicant: Huawei Digital Power Technologies Co., Ltd., Shenzhen (CN)

(72) Inventors: Donghao Wu, Shenzhen (CN); Baoshan Wu, Dongguan (CN); Chengliang Zhang, Dongguan (CN)

(73) Assignee: Huawei Digital Power Technologies Co., Ltd., Shenzhen (CN)

(*) Notice: Subject to any disclaimer, the term of this patent is extended or adjusted under 35 U.S.C. 154(b) by 78 days.

(21) Appl. No.: 17/853,286

(22) Filed: Jun. 29, 2022

(65) Prior Publication Data
US 2022/0337095 A1    Oct. 20, 2022

Related U.S. Application Data

(63) Continuation of application No. PCT/CN2020/117787, filed on Sep. 25, 2020.

(30) Foreign Application Priority Data

Dec. 31, 2019  (CN) .......................... 201911419098.3

(51) Int. Cl.
   *H02J 50/12*    (2016.01)
(52) U.S. Cl.
   CPC .................................... *H02J 50/12* (2016.02)
(58) Field of Classification Search
   CPC .................................. H02J 50/12; H02J 50/80
   See application file for complete search history.

(56) References Cited

U.S. PATENT DOCUMENTS

| | | |
|---|---|---|
| 2015/0207331 A1 | 7/2015 | Petersen |
| 2020/0044491 A1* | 2/2020 | Qiu .......................... H02J 50/40 |

(Continued)

FOREIGN PATENT DOCUMENTS

| | | |
|---|---|---|
| CN | 103683529 A | 3/2014 |
| CN | 103746462 A | 4/2014 |
| CN | 106849299 A | 6/2017 |

(Continued)

OTHER PUBLICATIONS

Qianhong Chen et al.,"Analysis, Design, and Control of a Transcutaneous Power Regulator for Artificial Hearts", IEEE Transactions on Biomedical Circuits and Systems, vol. 3, No. 1, Feb. 2009, Total 9 Pages.

*Primary Examiner* — Jeffrey M Shin
(74) *Attorney, Agent, or Firm* — Rimon PC

(57) ABSTRACT

This application provides a wireless power transmission system. The system includes a transmitter and a receiver, where the transmitter includes a DC/AC inverter circuit, a first resonant inductor, a first capacitor, and a first compensation inductor that are connected in series; and the receiver includes an AC/DC rectifier circuit, a second resonant inductor, a second capacitor, and a second compensation inductor that are connected in series; and power at the transmitter is transmitted to the receiver through electromagnetic induction between the first resonant inductor and the second resonant inductor, and the AC/DC rectifier circuit is configured to provide the rectified power to a load of the receiver. This solution is applicable to a wireless power supply scenario or a wireless charging scenario.

5 Claims, 15 Drawing Sheets

(56) References Cited

U.S. PATENT DOCUMENTS

2020/0136521 A1* 4/2020 Lin ................... H02M 3/33573
2020/0303940 A1* 9/2020 Harris ................... H02J 50/005

FOREIGN PATENT DOCUMENTS

| | | |
|---|---|---|
| CN | 206406776 U | 8/2017 |
| CN | 108199494 A | 6/2018 |
| CN | 108471173 A | 8/2018 |
| CN | 109245536 A | 1/2019 |
| CN | 110266113 A | 9/2019 |
| CN | 110277820 A | 9/2019 |
| CN | 108365654 B | 10/2019 |
| CN | 110492621 A | 11/2019 |
| CN | 110554236 A | 12/2019 |
| CN | 110601377 A | 12/2019 |
| CN | 111030318 A | 4/2020 |
| CN | 111146872 A | 5/2020 |
| DE | 102013000900 A1 | 7/2014 |
| KR | 20170059391 A | 5/2017 |
| WO | 2018175615 A1 | 9/2018 |

\* cited by examiner

WIRELESS POWER TRANSMISSION SYSTEM

CROSS-REFERENCE TO RELATED APPLICATIONS

This application is a continuation of International Application No. PCT/CN2020/117787, filed on Sep. 25, 2020, which claims priority to Chinese Patent Application No. 201911419098.3, filed on Dec. 31, 2019. The disclosures of the aforementioned applications are hereby incorporated by reference in their entireties.

TECHNICAL FIELD

This application relates to the field of circuits, and in particular, to a wireless power transmission system.

BACKGROUND

A customer premise equipment (CPE) is a device that receives a mobile signal and forwards the mobile signal in the form of a wireless Wi-Fi signal. Specifically, the CPE is a device for converting a 4G or 5G signal into a Wi-Fi signal. As shown in FIG. 1, the CPE includes an outdoor unit (ODU) and an indoor unit (IDU). During signal transmission from outdoors to indoors, signals need to penetrate through walls or glass, causing a large loss of mobile signals. Therefore, the mobile signal needs to be received by the outdoor unit ODU and transmitted to the indoor unit IDU. The indoor unit IDU converts the mobile signal into a Wi-Fi signal. In an existing solution for the CPE, the indoor unit and the outdoor unit are connected through power over Ethernet (POE) in a wired manner, and holes need to be drilled in the wall to lay out cables.

To resolve the power supply problem between the ODU and the IDU, the industry has focused on power transmission between the indoor unit and the outdoor unit in a wireless manner, without drilling holes in the wall for mounting, thereby reducing costs. As shown in FIG. 1, an indoor unit may include a wireless power supply unit 101 and a load 102 (for example, a wireless/laser modem). An outdoor unit may include a wireless power reception unit 103 and a load 104 (for example, a wireless/laser modem). The indoor unit supplies power to the outdoor unit wirelessly. Power is transmitted between the indoor unit and the outdoor unit by using the wireless power supply unit 101 and the wireless power reception unit 103. The wireless power supply unit 101 is a power transmitter (TX) in the wireless power transmission system, and the wireless power reception unit 103 is a power receiver (RX) in the wireless power transmission system.

In a process of transmitting power between the wireless power supply unit 101 and the wireless power reception unit 103, to ensure normal operation of the load of the receiver, an output voltage of the receiver needs to be kept stable through loop control. When the load of the receiver is dynamically changed, an operating frequency of the transmitter needs to be continuously adjusted, so that the output voltage of the receiver is kept stable. However, this wireless power transmission manner requires a fast response from the transmitter, but a response from the loop control is slow. When the load of the receiver is dynamically changed, the wireless power transmission system is powered off due to an untimely response.

SUMMARY

According to a first aspect, this application provides a wireless power transmission system, where the system includes a transmitter and a receiver;
the transmitter includes a DC/AC inverter circuit, a first resonant inductor L1, a first capacitor, and a first compensation inductor that are connected in series; and
the receiver includes an AC/DC rectifier circuit, a second resonant inductor, a second capacitor, and a second compensation inductor that are connected in series; and
power at the transmitter is transmitted to the receiver through electromagnetic induction between the first resonant inductor and the second resonant inductor, and the AC/DC rectifier circuit is configured to provide the rectified power to a load of the receiver.

In an implementation, a value of the first compensation inductor is obtained through calculation based on an upper limit and a lower limit of a standard limit of an operating frequency, an upper limit and a lower limit of a coupling coefficient obtained through a test, and an upper limit and a lower limit of an actual value of the first resonant inductor obtained through a test; and a value of the first capacitor is obtained through calculation based on a minimum value of an operating frequency of the transmitter, an inductance value of the first compensation inductor, the lower limit of the standard limit of the operating frequency, the lower limit of the coupling coefficient, and the lower limit of the actual value of the first resonant inductor obtained through a test.

According to a second aspect, this application provides a customer precise equipment CPE, where the customer precise equipment CPE includes the wireless power transmission system according to any one of the first aspect or the implementations of the first aspect, and an indoor unit and an outdoor unit; the indoor unit includes the transmitter and the outdoor unit includes the receiver; or the indoor unit includes the receiver and the outdoor unit includes the transmitter.

BRIEF DESCRIPTION OF DRAWINGS

FIG. 2A-1 is a schematic diagram of a structure of a wireless power transmission system according to an embodiment of this application;

FIG. 2A-2 is a function relationship between a coil inductance and a relative position relationship according to an embodiment of this application;

FIG. 2A-3 is a function relationship between a coupling coefficient and a relative position relationship according to an embodiment of this application;

FIG. 2A-4 is a function relationship between a coil current and a relative position relationship according to an embodiment of this application;

FIG. 2A-5 is a function relationship between system efficiency and a relative position relationship according to an embodiment of this application;

FIG. 4 is a schematic diagram of a structure of a wireless power transmission system according to an embodiment of this application;

FIG. 5 is a flowchart of detecting a resonant frequency and an inductance of a transmitter according to an embodiment of this application;

DESCRIPTION OF EMBODIMENTS

Figure 1:
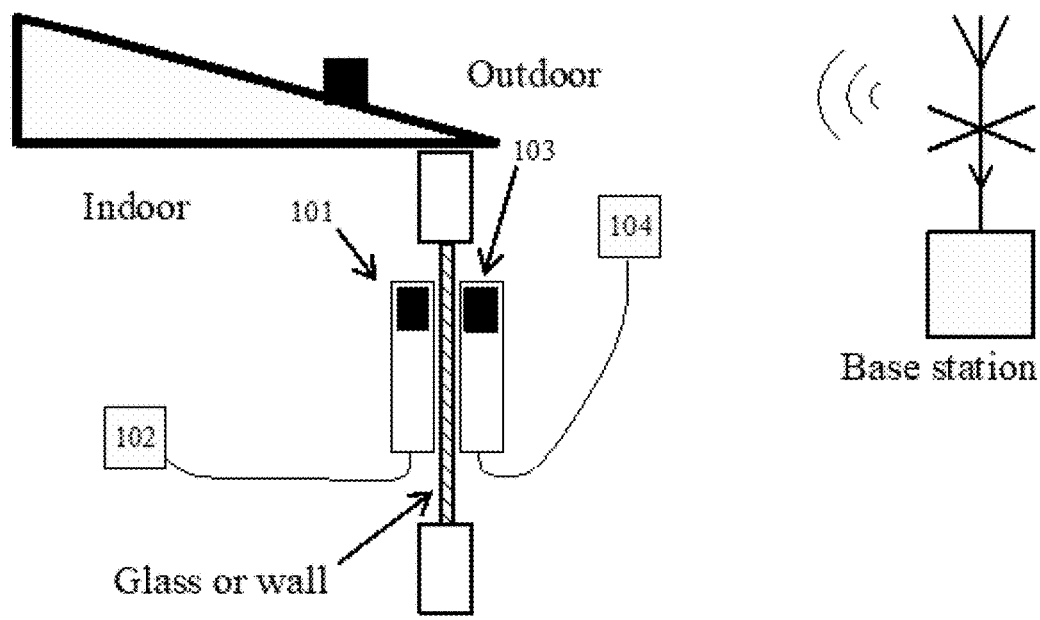
FIG. 1 is a schematic diagram of a structure of a CPE according to an embodiment of this application.

As shown in FIG. 1, an indoor unit may include a wireless power supply unit 101 and a load 102 (for example, a wireless/laser modem). An outdoor unit may include a wireless power reception unit 103 and a load 104 (for example, a wireless/laser modem). The indoor unit supplies power to the outdoor unit wirelessly. Power is transmitted between the indoor unit and the outdoor unit by using the wireless power supply unit 101 and the wireless power reception unit 103. In another implementation, the wireless power supply unit 101 is located at the outdoor unit, and the wireless power reception unit is located at the indoor unit. That is, the outdoor unit supplies power to the indoor unit.

It should be noted that the wireless power transmission system provided in embodiments of this application is not only applicable to a long-distance power transmission scenario from the indoor unit to the outdoor unit, but also applicable to a wireless charging scenario. In the wireless charging scenario, the wireless power supply unit 101 is located on a wireless charger and the wireless power reception unit 103 is located on an electronic device. The wireless charger transmits power to the electronic device by using the wireless power supply unit 101, to charge the electronic device. In other words, a transmitter is located on the wireless charger, and a receiver is located on the electronic device. The electronic device may be specifically a terminal device, for example, any device that supports wireless charging, such as a mobile phone, a tablet computer, or a wearable device.

Figures 1, 2A:
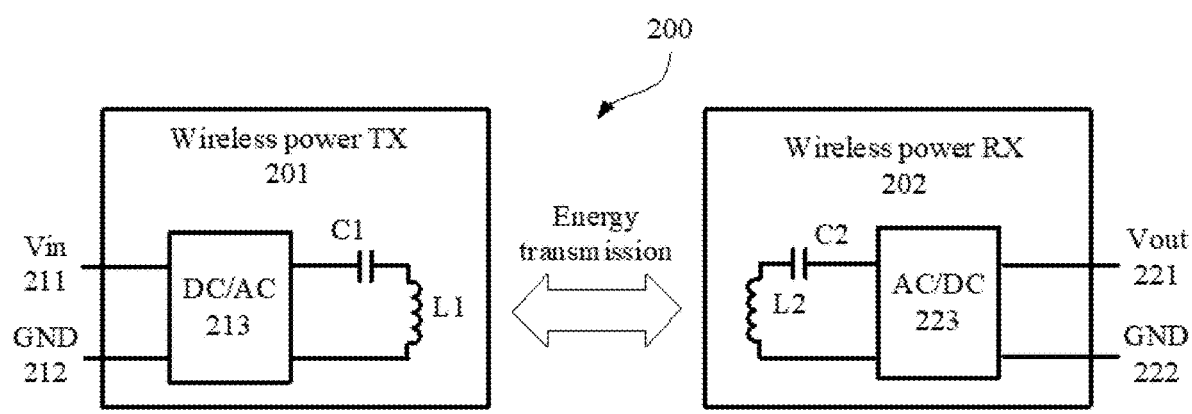

As shown in FIG. 2A-1, a wireless power transmitter TX 201 in a wireless power transmission system 200 is the wireless power supply unit 101, and a wireless power receiver RX 202 in the wireless power transmission system 200 is the wireless power reception unit 103. Energy transmission between the transmitter TX 201 and the receiver RX 202 is implemented through electromagnetic induction between an inductor L1 and an inductor L2. The wireless power transmission system means transmitting power in a wireless manner.

The wireless power transmitter TX 201 includes a resonant circuit formed by connecting a direct current/alternating current (DC/AC) inverter circuit 213, a capacitor C1, and a coil L1 in series, where the DC/AC inverter circuit 213 may use a half-bridge or full-bridge topology. One end 211 of the wireless power TX 201 can be connected to a load (for example, the load 102 in FIG. 1) and then connected to a power supply; or one end 211 of the wireless power TX 201 can be directly connected to a power supply. Vin represents an input voltage of the wireless power TX, and GND 212 represents a wire ground.

The wireless power TX 201 includes the DC/AC circuit 213, the capacitor C1, and the inductor L1, where the DC/AC circuit 213 is connected to the capacitor C1 and the inductor L1 in series.

The wireless power RX 202 includes an AC/DC circuit 223, a capacitor C2, and an inductor L2, where the AC/DC circuit 223 is connected to the capacitor C2 and the inductor L2 in series.

The wireless power receiver RX 202 includes a resonant circuit formed by connecting the alternating current/direct current (AC/DC) rectifier circuit 223, the capacitor C2, and a coil L2 in series, where the AC/DC rectifier circuit may use a half-bridge or full-bridge topology and may be rectified in a synchronization manner or a diode manner. One end 221 of the wireless power RX 202 can be connected to a load (for example, the load 104 in FIG. 1). Vout represents an output voltage of the wireless power RX and GND represents a wire ground.

To ensure normal operation of the load connected to the receiver RX 202, the output voltage Vout of the receiver needs to be kept stable. In the conventional technology, a relatively stable output voltage is implemented through loop control: when the load of the receiver is dynamically changed, an operating frequency of the transmitter is continuously adjusted, to keep the output voltage of the receiver stable. However, because a response of the loop control is relatively slow, when the load of the receiver is dynamically changed, the wireless power transmission system is powered off due to an untimely response.

In embodiments of this application, a stable voltage output is implemented by using a circuit characteristic of a series resonant circuit.

The series resonant circuit is one of the resonant circuits. In an alternating-current circuit with an inductor L element (also commonly referred to as a coil) and a capacitor C element, and voltage phases at two ends of the circuit are generally different from current phases at the two ends of the circuit. If a parameter or a power supply frequency of the circuit element (L or C) is adjusted, the voltage phases and the current phases can be the same and the entire circuit is purely resistive. A circuit reaching the state is referred to as the resonant circuit. In a resonant state, a total impedance of the circuit reaches an extreme value or approximately reaches an extreme value. According to different circuit connection methods, there is a series resonant circuit and a parallel resonant circuit. The series resonant circuit has a frequency selection characteristic: when an input end is connected to a sinusoidal alternating-current voltage source with a constant amplitude, and if a frequency of an input voltage is changed, a signal amplitude of an output voltage of the series resonant circuit is changed with the change of the frequency of the input signal. When a frequency of the output voltage is a frequency $f_0$, an amplitude of the output voltage reaches a maximum value. When the frequency of the output voltage is far away from $f_0$, the output amplitude value of the output voltage gradually decreases. $f_0$ is referred to as a resonant frequency of the series resonant circuit. In this case, an inductor and a capacitor in the series resonant circuit exchange energy with each other. This is equivalent to one wire to the outside.

In an implementation, both the transmitter TX 201 and the receiver RX 202 in the wireless power transmission system 200 are series resonant circuits. When the wireless power transmission system operates at a specific frequency f, the wireless power transmission system may have a constant voltage output characteristic in which the output voltage Vout is unrelated to the load of the receiver RX 202, so as to meet a requirement of the wireless power transmission system for a dynamic response.

When the transmitter and the receiver of the wireless power transmission system have the same coil inductance and resonant capacitance, that is, L1=L2 and C1=C2, a constant voltage operating frequency f is defined as follows:

$$f = \frac{f_0}{\sqrt{1-k}} \quad \text{(Formula 1.1)}$$

where $f_0$ represents a resonant frequency of the transmitter TX and k represents a coupling coefficient between an inductor of the transmitter and an inductor of the receiver.

When the transmitter and the receiver have different inductances and capacitances, to ensure that the wireless power transmission system has a constant voltage operating frequency, the inductance L1 and the capacitance C1 of the transmitter and the inductance L2 and the capacitance C2 of the receiver should meet the following relationship:

L1*C1=L2*C2

When the foregoing relationship is met, the definition of the constant voltage operating frequency f is still shown in formula 1.1.

In the circuit, the coupling coefficient represents a tightness degree of coupling between elements, and a ratio of an actual mutual inductance (an absolute value) between two inductor elements to a maximum extreme value of the mutual inductance between the two inductor elements is defined as the coupling coefficient. In the wireless power transmission system, the coupling coefficient may represent a ratio of energy sent by the inductor L1 of the transmitter to energy received by the inductor L2 of the receiver. A larger coupling coefficient indicates a larger ratio of the energy sent by the inductor L1 of the transmitter to the energy received by the inductor L2 of the receiver. The coupling coefficient is related to a distance between the inductor L1 of the transmitter and the inductor L2 of the receiver, and is also related to a medium between the inductor L1 of the transmitter and the inductor L2 of the receiver. In the wireless power transmission system, the distance between the inductor L1 of the transmitter and the inductor L2 of the receiver may be a thickness of glass or a wall, and a change range of a corresponding coupling coefficient is quite wide. This poses a new challenge to a system design. After a relative position between the transmitter and the receiver in the wireless power transmission system is fixed, the constant voltage operating frequency is not changed. However, for the transmitter and the receiver of the same wireless power transmission system, the constant voltage operating frequency is changed with a change of the relative position between the transmitter and the receiver. Relative positions of placement or mounting between the transmitter and the receiver are different in actual use. Therefore, the relative position between the transmitter and the receiver can be tested online, to obtain $f_0$ and the coupling coefficient k, and then obtain the constant voltage operating frequency. Certainly, $f_0$ and the coupling coefficient k can be directly detected to obtain the constant voltage operating frequency. In addition to the resonant frequency $f_0$ and the coupling coefficient k, the relative position between the transmitter and the receiver further affects a plurality of parameters of the wireless power transmission system, for example, system efficiency, a current passing through the inductor of the transmitter, and a voltage (that is, an output voltage of an AC/DC circuit) of the receiver.

Figures 2, 2A:
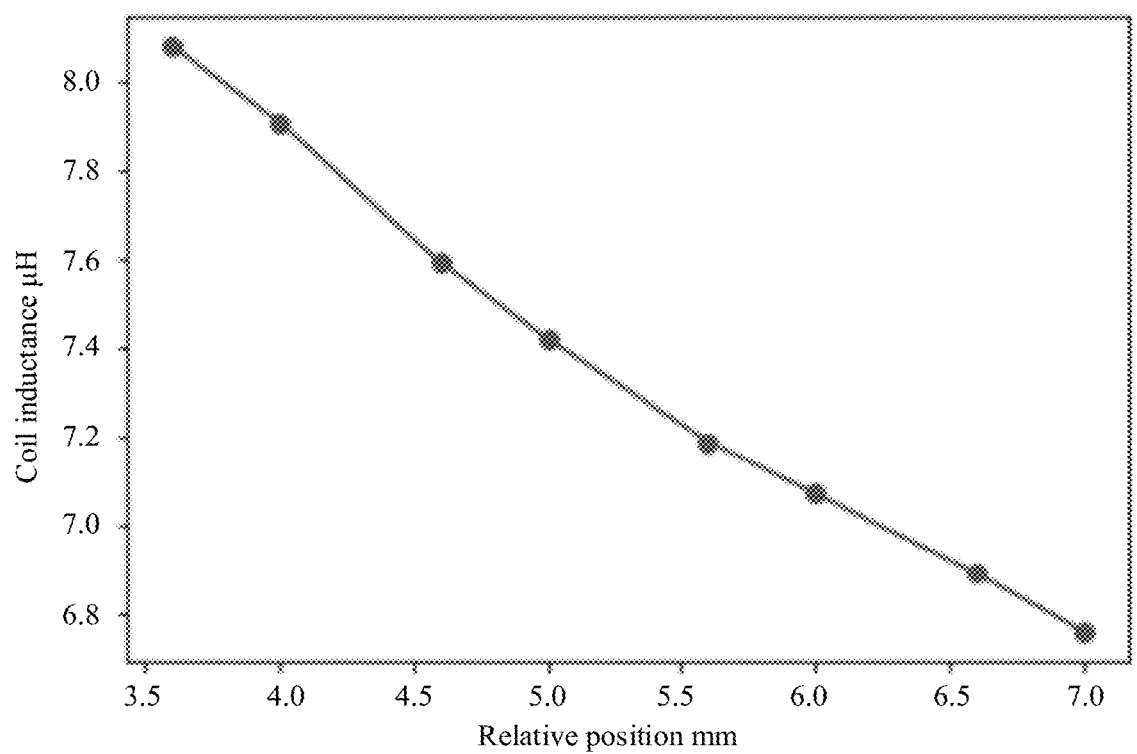
Figures 2, 2A, 3:
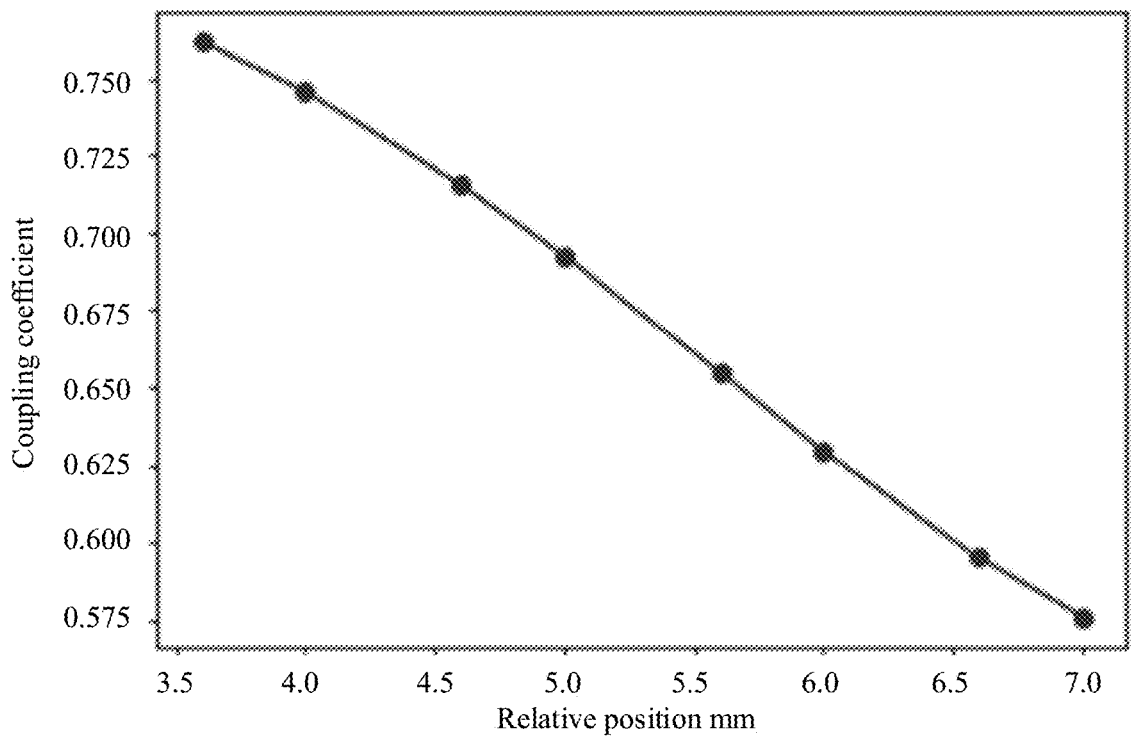

In an implementation, when it is inconvenient to measure the resonant frequency $f_0$ and the coupling coefficient k, a current distance between the transmitter and the receiver may be alternatively represented by using the foregoing related parameters or a combination thereof, to obtain a corresponding constant voltage operating point. FIG. 2A-2 shows a relationship in which an inductance of a coil is changed with a relative position. FIG. 2A-3 shows a relationship in which a coupling coefficient is changed with a relative position. FIG. 2A-4 shows a relationship in which a current of a transmitting coil is changed with a relative position. FIG. 2A-5 shows a relationship in which system efficiency is changed with a relative position. These parameters are all changed singly with a change of a position, and can be used to determine a current position.

Similar to the series resonant circuit, other types of resonant circuits also have respective constant voltage operating frequencies. In a wireless power transmission system 300 shown in FIG. 2B, a transmitter is the parallel resonant circuit, and a receiver is the series resonant circuit.

In the wireless power transmission system 300, a wireless power transmitter TX is the wireless power supply unit, and a wireless power receiver RX is the wireless power reception unit 103. Energy transmission between the transmitter TX and the receiver RX is implemented through electromagnetic induction between an inductor L1 and an inductor L2. The wireless power transmission system means transmitting power in a wireless manner.

The wireless power transmitter TX includes a direct current/alternating current (DC/AC) inverter circuit 313, a capacitor C1, an inductor L1, and an inductor L1', where the DC/AC inverter circuit 313 may use a half-bridge or full-bridge topology. One end 311 of the wireless power TX can be connected to a load (for example, the load 102 in FIG. 1); or one end 311 of the wireless power TX can be directly connected to a power supply. Vin represents an input voltage of the wireless power TX, and GND 312 represents a wire ground.

On the wireless power TX side, the inductor L1 and the capacitor C1 are connected in parallel, both one end of the inductor L1 and one end of the capacitor C1 are connected to the inductor L1', and the inductor L1' is connected to an output end of the DC/AC circuit 313. Both the other end of the inductor L1 and the other end of the capacitor C1 are connected to the output end of the DC/AC circuit 313.

The wireless power RX includes an AC/DC circuit 323, a capacitor C2, and an inductor L2, where the AC/DC circuit 323 is connected to the capacitor C2 and the inductor L2 in series.

The wireless power receiver RX includes a resonant circuit formed by connecting the alternating current/direct current (AC/DC) rectifier circuit 323, the capacitor C2, and a coil L2 in series, where the AC/DC rectifier circuit may use a half-bridge or full-bridge topology and may be rectified in a synchronization manner or a diode manner. One end 321 of the wireless power RX can be connected to a load (for example, the load 104 in FIG. 1). Vout represents an output voltage of the wireless power RX, and GND represents a wire ground.

$$L1' = L1 = L2$$
$$C1 = C2$$

When the foregoing relationship is met, the wireless power transmission system 300 has a constant voltage operating frequency f:

$$f = \frac{1}{2\pi\sqrt{L1C1}}$$

When the wireless power transmission system operates at the constant voltage operating frequency, a gain G of the system is:

$$G = k$$

where k represents a coupling coefficient between the inductor L1 of the transmitter and the inductor L2 of the receiver.

Figure 2B:
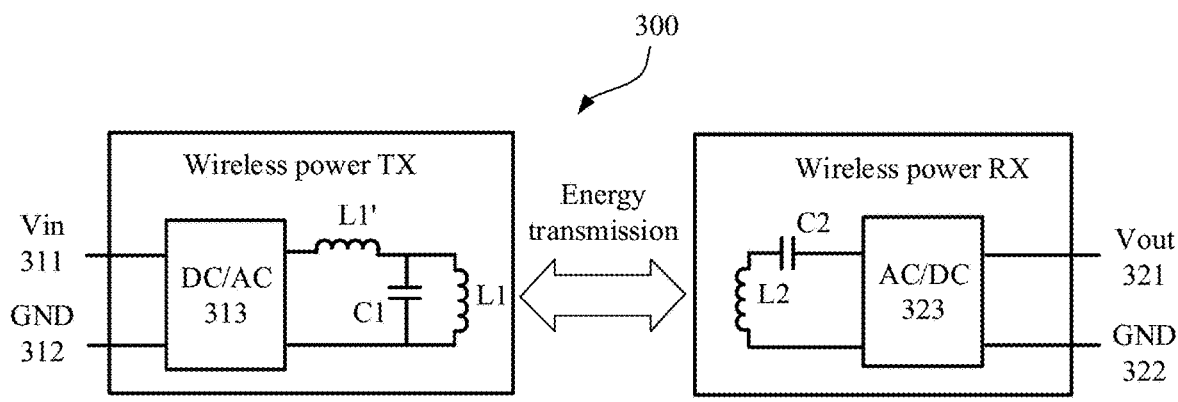
FIG. 2B is a schematic diagram of a structure of a wireless power transmission system according to an embodiment of this application.
Figure 3A:
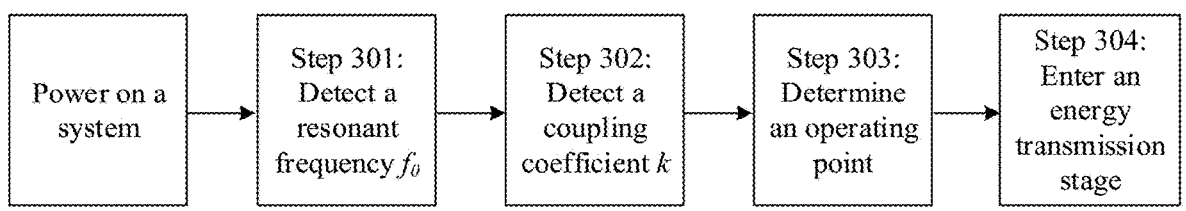
FIG. 3A is a schematic flowchart of a wireless power transmission method according to an embodiment of this application.

An embodiment of this application provides a wireless power transmission method. The wireless power transmission method is applicable to the wireless power transmission system shown in FIG. 2A-1, FIG. 2B, or FIG. 12. A process of the wireless power transmission method is shown in FIG. 3A. The method includes the following steps.

Step 301: Detect a resonant frequency $f_0$ of a transmitter, and calculate an inductance value of a transmitting coil L1 of the transmitter.

First, a capacitor C1 of a transmitter is charged, then the capacitor C1 is discharged, and an oscillation attenuation of a voltage Vcoil between the capacitor C1 and an inductor L1 during discharging of the capacitor C1 is recorded. An oscillation period of the voltage Vcoil is calculated based on the oscillation attenuation of the voltage Vcoil, and then a frequency of the voltage Vcoil is obtained, where the frequency is the resonant frequency $f_0$ of the transmitter.

Optionally, a value of the capacitor C1 of the transmitter is recorded in advance, and then a value of the inductor L1 of the transmitter is calculated based on the calculated resonant frequency $f_0$.

Step 302: Detect a coupling coefficient k between the transmitter and a receiver.

Because a constant voltage operating frequency f depends on the resonant frequency $f_0$ of the transmitter and the coupling coefficient k between the transmitter and the receiver, the constant voltage operating frequency f is affected by a relative distance between the transmitter and the receiver of the wireless power transmission system. After the indoor unit and the outdoor unit are mounted and powered on, the relative distance between the transmitter and the receiver of the wireless power transmission system is fixed. Therefore, after mounting, the coupling coefficient between the transmitter and the receiver in the wireless power transmission system is also fixed. The coupling coefficient between the transmitter and the receiver is related to an output voltage of a rectifier circuit of the receiver in a no-load state, a current of the inductor L1 of the transmitter, an inductance L1 of the transmitter, and an operating frequency of the transmitter.

Step 303: Determine an operating point.

After the resonant frequency $f_0$ of the transmitter and the coupling coefficient k between the transmitter and the receiver are obtained through detection, the constant voltage operating frequency f can be calculated according to the formula 1.1 (the constant voltage operating frequency f may also be referred to as a constant voltage operating point). The operating frequency is a frequency of an alternating current.

Optionally, the constant voltage operating frequency can be calculated by the transmitter, or can be calculated by the receiver, or can be calculated by a third-party device independent of the transmitter and the receiver. This is not limited herein.

Optionally, a deviation may exist in a process of detecting the resonant frequency $f_0$ and the coupling coefficient k. Therefore, a deviation may exist between the constant voltage operating frequency calculated based on a detection result and an actual constant voltage operating frequency. Therefore, the accuracy of a calculation result of the constant voltage operating frequency can be determined before an energy transmission stage. The wireless power transmission system detects Vin of the DC/AC inverter circuit of the transmitter and a rectified voltage Vrect of the receiver to calculate a gain when operating at the constant voltage operating frequency, and thus determines whether an operating point needs to be adjusted.

Optionally, the adjusted operating point, that is, the adjusted constant voltage operating frequency, is determined through frequency sweeping. The wireless power transmission system performs frequency sweeping at a specific step within a small range near the calculated constant voltage operating frequency, continuously adjusts the operating frequency of the transmitter through frequency sweeping, and finds an operating frequency when a gain reaches a threshold. The operating frequency when the gain reaches the threshold is the adjusted constant voltage operating frequency. The gain is a ratio of the output voltage of the receiver to the input voltage of the transmitter, and may also be referred to as a constant voltage gain. The thresholds of the gains corresponding to the wireless power transmission system in different operating statuses may be different, and the operating status of the wireless power transmission system may be a no-load state, a half-load state, or a full-load state. For example, the threshold of the gain of the wireless power transmission system in the no-load state may be 1.

The wireless power transmission system in the no-load state is used as an example. The following two modes may be used to determine the adjusted constant voltage operating frequency through frequency sweeping:

(1) If the receiver operates at the calculated constant voltage operating frequency as an operating frequency, an actual gain is less than 1, and starting from the calculated constant voltage operating frequency, the operating frequency is decreased by a specific step, and a corresponding operating frequency when the gain is 1 is found; and if the receiver operates at the calculated constant voltage operating frequency as the operating frequency, the actual gain is greater than 1, and starting from the calculated constant voltage operating frequency, the operating frequency is increased by a specific step, and the corresponding operating frequency when the gain is 1 is found.

(2) Within a specific frequency range near the calculated constant voltage operating frequency, starting from an upper limit of the frequency range, the frequency is gradually decreased by a specific step, and the corresponding operating frequency when the gain is 1 is found.

Step 304: Enter an energy transmission stage.

After the parameter detection and the frequency sweeping are completed to obtain the constant voltage operating frequency, loop opening can be performed at the energy transmission stage. The operating frequency of the wireless power transmission system is controlled to be the operating point determined in step 303, that is, a frequency of an alternating current output by the DC/AC circuit 213 of the transmitter is controlled to be kept at the constant voltage operating frequency f Because the operating frequency of the transmitter is kept at the constant voltage operating frequency f, the wireless power transmission system may have a constant voltage output characteristic that the output voltage Vout of the receiver is unrelated to the load of the receiver RX 202. Therefore, the output voltage of the receiver in the wireless power transmission system is not changed greatly due to the change of the load of the receiver, and a dynamic response requirement of the wireless power transmission system can be met.

Figures 2, 2A, 3, 4:
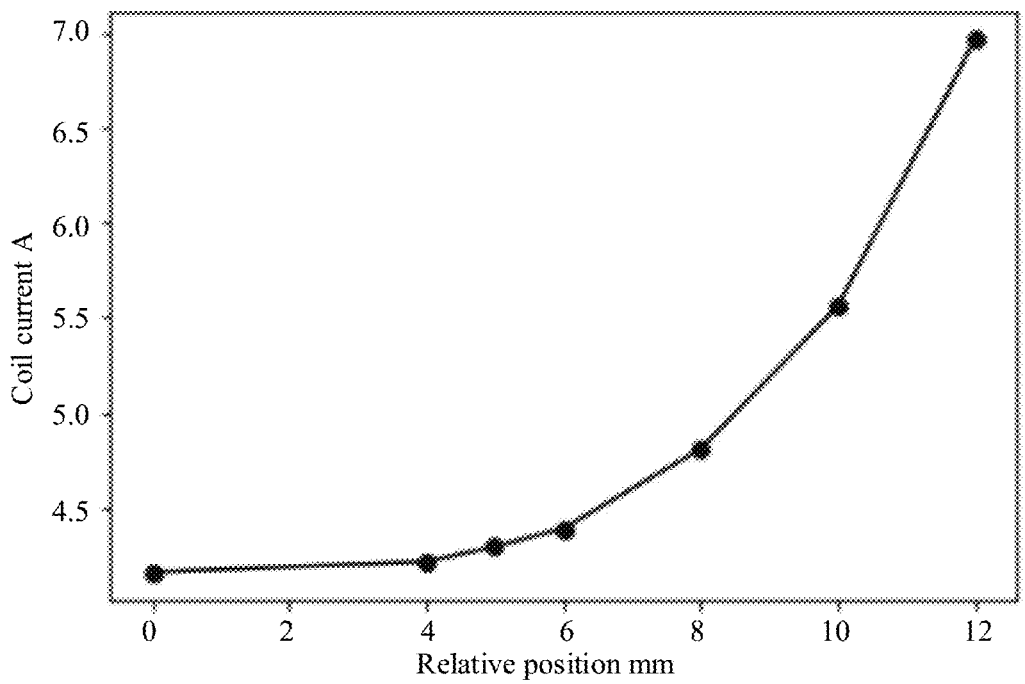

FIG. 4 is a schematic diagram of a wireless power transmission system according to an embodiment of this application. A process of detecting a resonant frequency occurs on a transmitter side. FIG. 4 specifically describes a structure of the DC/AC circuit 213 in the wireless power TX in FIG. 2A-1. For the wireless power RX side, FIG. 4 shows only the inductor L2, and the remaining parts are not shown in the figure. The DC/AC circuit 213 in FIG. 4 includes four switches: S1 to S4, where S1 to S4 may be specifically metal oxide semiconductor (MOS) transistors.

Figures 2, 2A, 3, 4, 5:
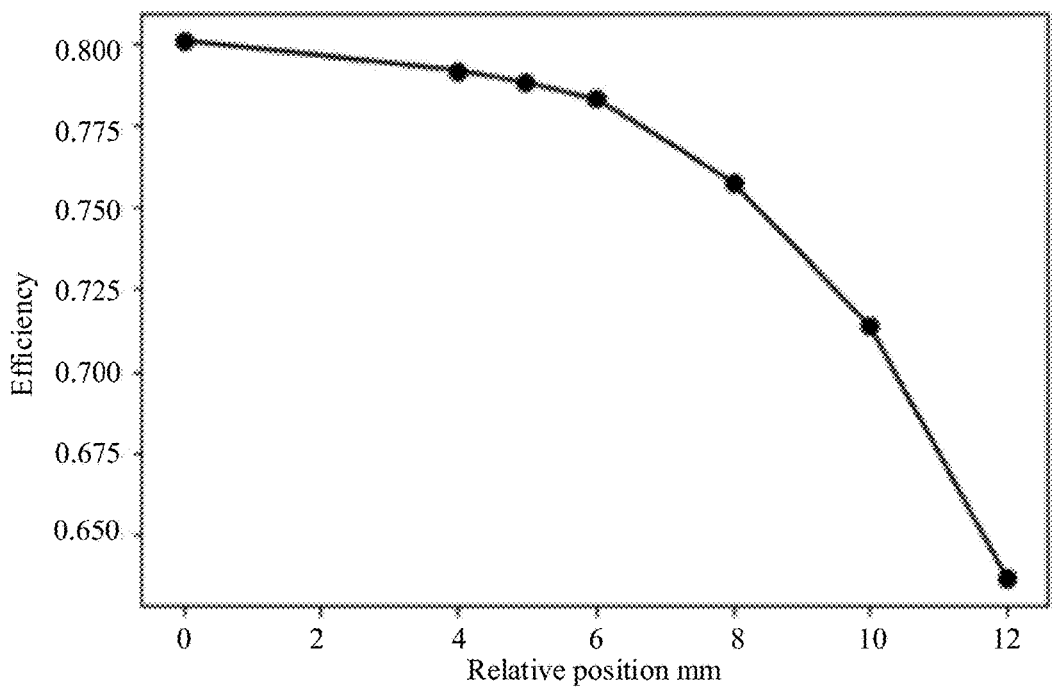

For step 301, FIG. 5 is a specific flowchart of detecting a resonant frequency and an inductance of a transmitter. Step 301 may include the following steps.

Step 401: Provide a direct-current voltage for a full-bridge bus of the transmitter, and turn on S1 and S4 to charge the capacitor C1.

After the transmitter is powered on, S1 and S4 are controlled to be turned on. In this case, S1 and S4 are turned on, and S2 and S3 are turned off. A direct-current voltage V1 is provided for a full-bridge bus of the transmitter to charge the capacitor C1. In this case, the receiver may keep the load disconnected. Specifically, the transmitter can send a signal to the receiver, where the signal is used to indicate a processor of the receiver to control the load of the receiver to remain in a disconnected state.

Step 402: Turn off S1 and turn on S2.

When the transmitter is in a steady state, the transmitter controls S1 to be turned off and S2 to be turned on. In this case, S3 still remains in a disconnected state, and S4 still remains in a connected state. Specifically, a processor of the transmitter can send a control signal for controlling connection or disconnection of the switches. L1, C1, S2, and S4 form a loop, and power stored in the capacitor C1 is discharged in the loop. When voltages at two ends of the capacitor C1 of the transmitter are not changed or a change rate of the voltages is less than a specific threshold, the transmitter is in the steady state.

Step 403: Calculate the resonant frequency $f_0$ of the transmitter based on an oscillation attenuation of a voltage Vcoil between the capacitor C1 and the inductor L1.

During discharging of the capacitor C1 in the loop formed by L1, C1, S2, and S4, the voltage Vcoil between the capacitor C1 and the inductor L1 is attenuated over time. The oscillation attenuation of the voltage Vcoil may be shown on a right side of FIG. 4.

A value of the voltage Vcoil at each moment is compared with a specified value in a comparator. Each time the value of the voltage Vcoil of an oscillation waveform reaches the specified value of the comparator, the comparator reverses once, that is, oscillation is performed on the voltage Vcoil once. A quantity of reversals of the comparator within a specific time is calculated, so as to learn an oscillation frequency of the voltage Vcoil. The oscillation frequency of the voltage Vcoil is the resonant frequency $f_0$ of the transmitter. An oscillation period of the voltage Vcoil is a difference between times of two adjacent reversals, and the resonant frequency $f_0$ of the transmitter is a reciprocal of the oscillation period of the voltage Vcoil. It is assumed that it is detected that the voltage Vcoil reaches the specified value of the comparator at a moment T1 and that the voltage Vcoil reaches the specified value of the comparator at a moment T2 adjacent to the moment T1. In this case, a difference between T1 and T2 is the oscillation period of the voltage Vcoil.

Optionally, a counter is disposed in the processor of the transmitter. Each time the value of the voltage Vcoil of the oscillation waveform reaches the specified value of the comparator, the counter increases a quantity of times of counting, and a time difference between two counts is the oscillation period of the oscillation waveform. The reciprocal of the oscillation period is the oscillation frequency of the voltage Vcoil, and the oscillation frequency of the voltage Vcoil is the resonant frequency $f_0$ of the transmitter.

Step 404: Calculate the inductance L1 of the transmitter.

Because the value of the capacitor C1 of the transmitter is known, the transmitter can obtain the inductance L1 through calculation based on the calculated resonant frequency $f_0$ of the transmitter.

$$L1 = \frac{1}{(2\pi f_0)^2 Ci}$$

Figure 6:
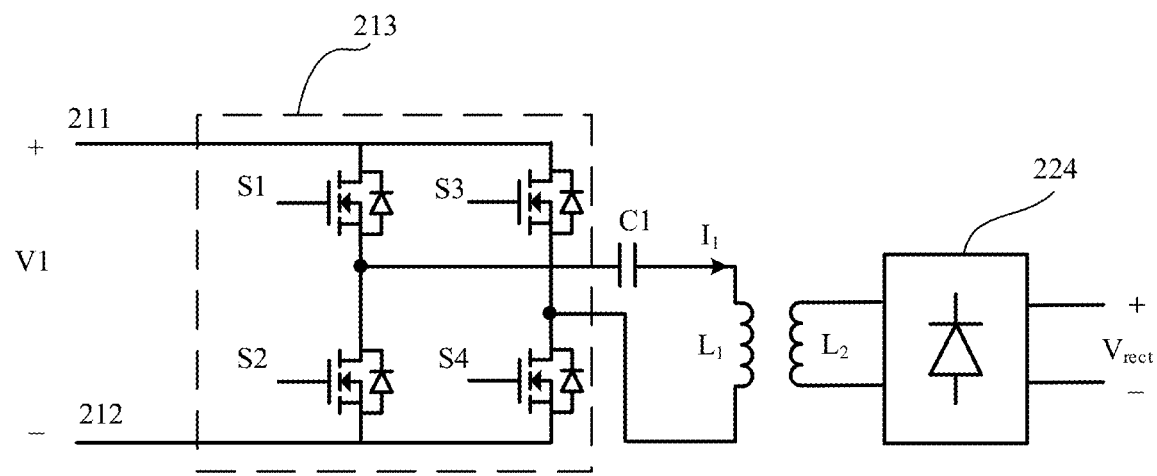
FIG. 6 is a schematic diagram of a structure of a wireless power transmission system according to an embodiment of this application.

FIG. 6 specifically describes a structure of the DC/AC circuit 213 in the wireless power TX in FIG. 2A-1. The DC/AC circuit 213 in FIG. 7 includes four switches: S1 to S4, where S1 to S4 may be specifically metal oxide semiconductor (MOS) transistors. The rectifier circuit 224 in FIG. 7 includes the AC/DC circuit 223 and the capacitor C1 in FIG. 2A-1 to FIG. 2B, and a voltage value output by the rectifier circuit 224 is Vrect.

Figure 7:
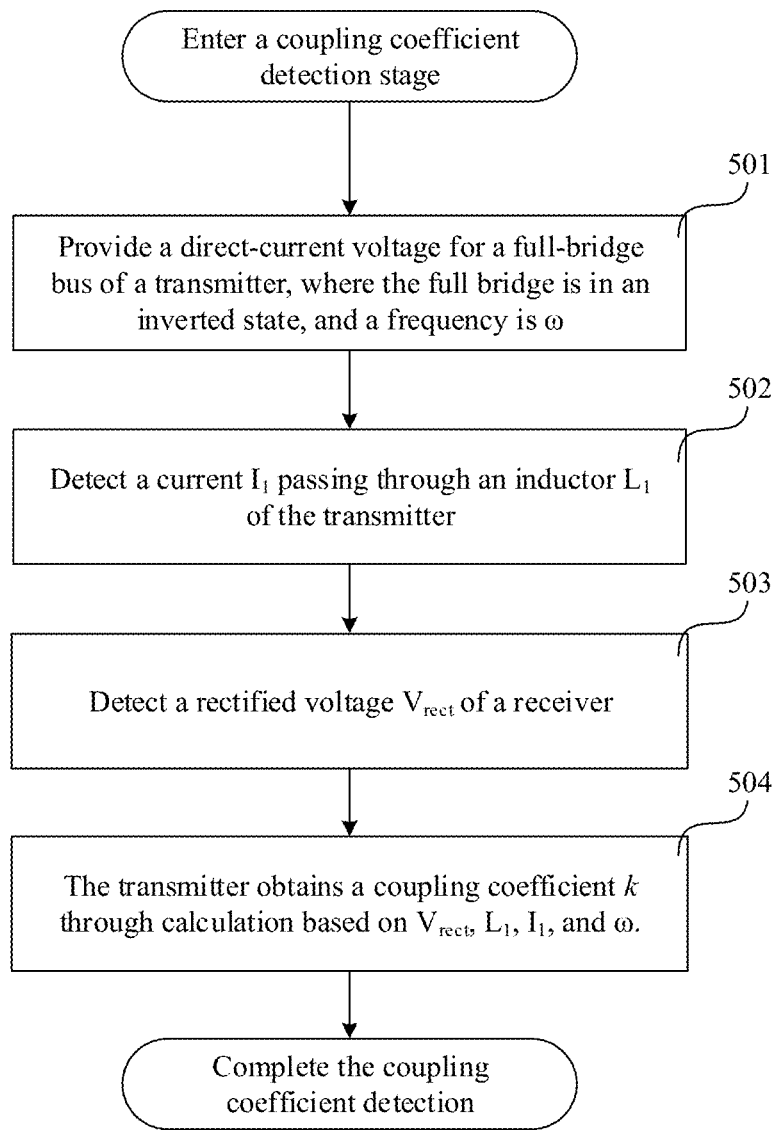
FIG. 7 is a flowchart of detecting a coupling coefficient according to an embodiment of this application.

For step 302, FIG. 7 is a specific process of detecting a coupling coefficient according to an embodiment of this application. The step may specifically include the following steps.

Step 501: Set the transmitter to operate at an operating frequency ω.

A direct-current voltage V1 is provided for the full-bridge bus of the transmitter, so that the DC/AC circuit 213 is in an inverted operating state. The operating frequency of the transmitter is set to ω, and a load state of the receiver is set to one of a no-load state, a light-load state, or a specific fixed-load state. The operating frequency of the transmitter is the frequency of the alternating current output by the DC/AC circuit 213 of the transmitter.

Step 502: The transmitter detects a current $I_1$ passing through the inductor L1 of the transmitter.

Specifically, the processor of the transmitter may detect, by using a detection circuit, a current $I_1$ passing through the inductor L1 of the transmitter.

Step 503: The receiver detects a rectified voltage $V_{rect}$.

Power is transferred from the transmitter to the receiver through energy transmission between the inductor L1 and the inductor L2. After receiving the power, the inductor L2 of the receiver inputs the power into the rectifier circuit 224. The processor of the receiver detects an output voltage $V_{rect}$ of the rectifier circuit 224.

Further, the receiver can send a value of the rectified voltage $V_{rect}$ obtained through detection to the transmitter.

Step 504: The transmitter obtains the coupling coefficient through calculation based on $V_{rect}$, L1, $I_1$, and ω.

The coupling coefficient k is calculated based on the output voltage $V_{rect}$ of the receiver, the operating frequency ω of the transmitter, the calculated inductance L1 of the transmitter, and the current $I_1$ passing through the inductor L1 of the transmitter.

$$k = \frac{V_{rect}}{\omega L_1 I_1}$$

Optionally, the coupling coefficient is k:

$$k = \frac{V_{rect}}{\omega L_1 I_1} \cdot \alpha$$

The coefficient α is a calibration coefficient, and a value may be $\pi/(2\sqrt{2})$.

An open-circuit alternating-current voltage is required to calculate the coupling coefficient, but $V_{rect}$ is a direct-current voltage during actual test. Therefore, a calibration coefficient is required.

In an embodiment, after the constant voltage operating point is determined, and if the determined constant voltage operating frequency is at or exceeds an upper limit of an operating frequency range of the DC/AC circuit, in an implementation, the DC/AC circuit can be controlled to operate at the upper limit of the operating frequency, and a duty cycle can be adjusted, so that the system covers a larger distance range. In another implementation, a pre-stage DC/DC circuit is added to the transmitter or a next-stage DC/DC circuit is added to the receiver, so that the system covers a larger distance range. The determined constant voltage operating frequency may be the calculated constant voltage operating frequency, or may be an operating frequency obtained after adjustment is performed based on the calculated constant voltage operating frequency, that is, the adjusted constant voltage operating frequency.

In another embodiment, considering impact of the change of the load of the receiver on the gain of the system, an actual operating frequency of the DC/AC inverter circuit is adjusted within a specific range of the determined constant voltage operating frequency, and the processor of the transmitter controls the DC/AC inverter circuit to adjust the actual operating frequency within a small range of the determined constant voltage operating frequency. A frequency adjustment range enables a gain range of the wireless power transmission system to be in a range of a gain threshold, for example, in a range of 0.9 to 1.2 (which may include two endpoint values of 0.9 and 1.2).

Figure 3B:
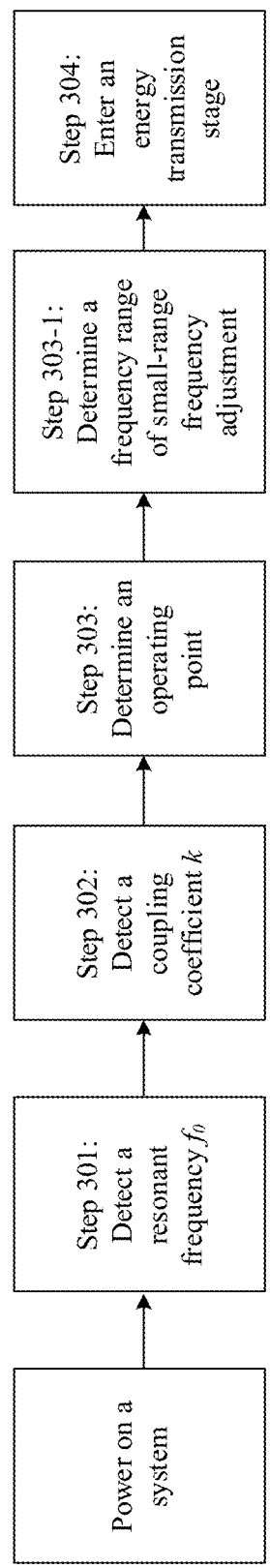
FIG. 3B is a schematic flowchart of a wireless power transmission method according to an embodiment of this application.

As shown in FIG. 3B, after step 303, step 303-1 is further included: determining a frequency range of small-range frequency adjustment.

A frequency range (fmin2, fmax2) of small-range frequency adjustment is determined, where the range of the small-range frequency adjustment is a sub-interval of an operating frequency range (fmin1, fmax1) of the DC/AC inverter circuit. There are two methods of determining the frequency range of the small-range frequency adjustment. One method is that the frequency range of the small-range frequency adjustment is calculated based on the operating point determined in step 303 and according to a predetermined algorithm. The other method is that the frequency range of the small-range frequency adjustment is obtained through the small-range frequency sweeping mentioned in step 303.

Figure 3C:
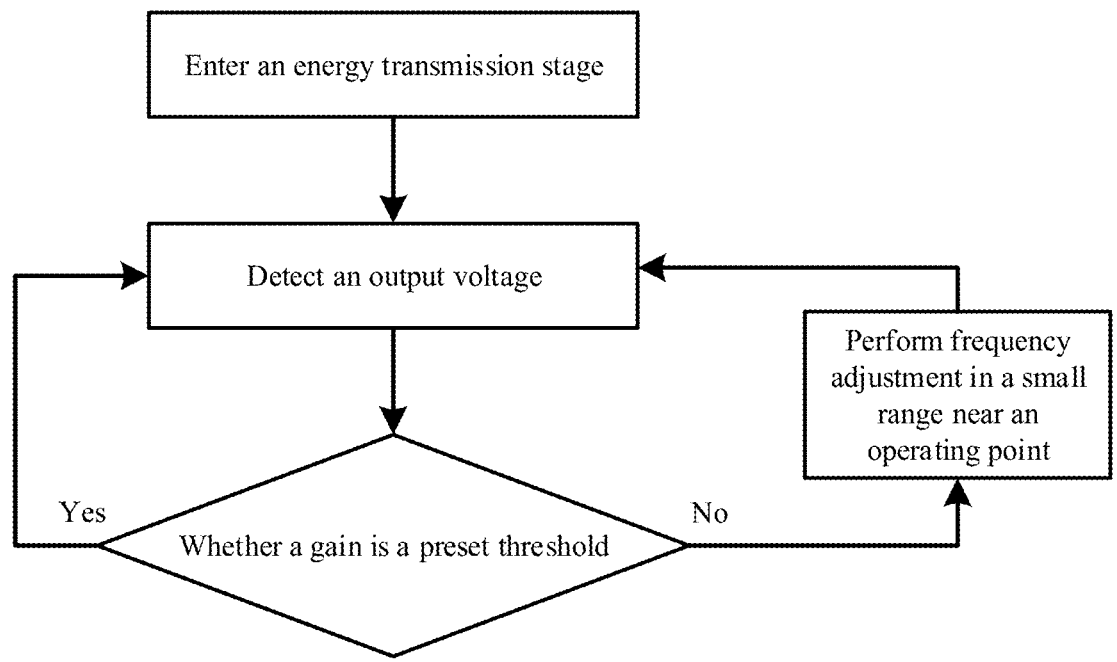
FIG. 3C is a schematic flowchart of a wireless power transmission method according to an embodiment of this application.
Figure 4:
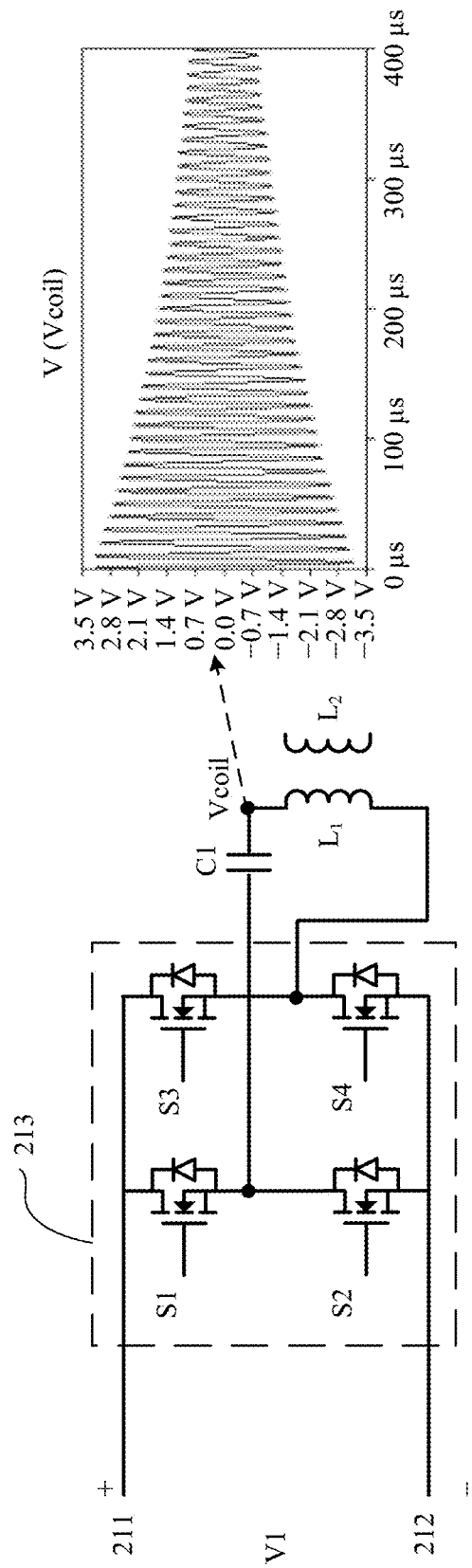
Figure 5:
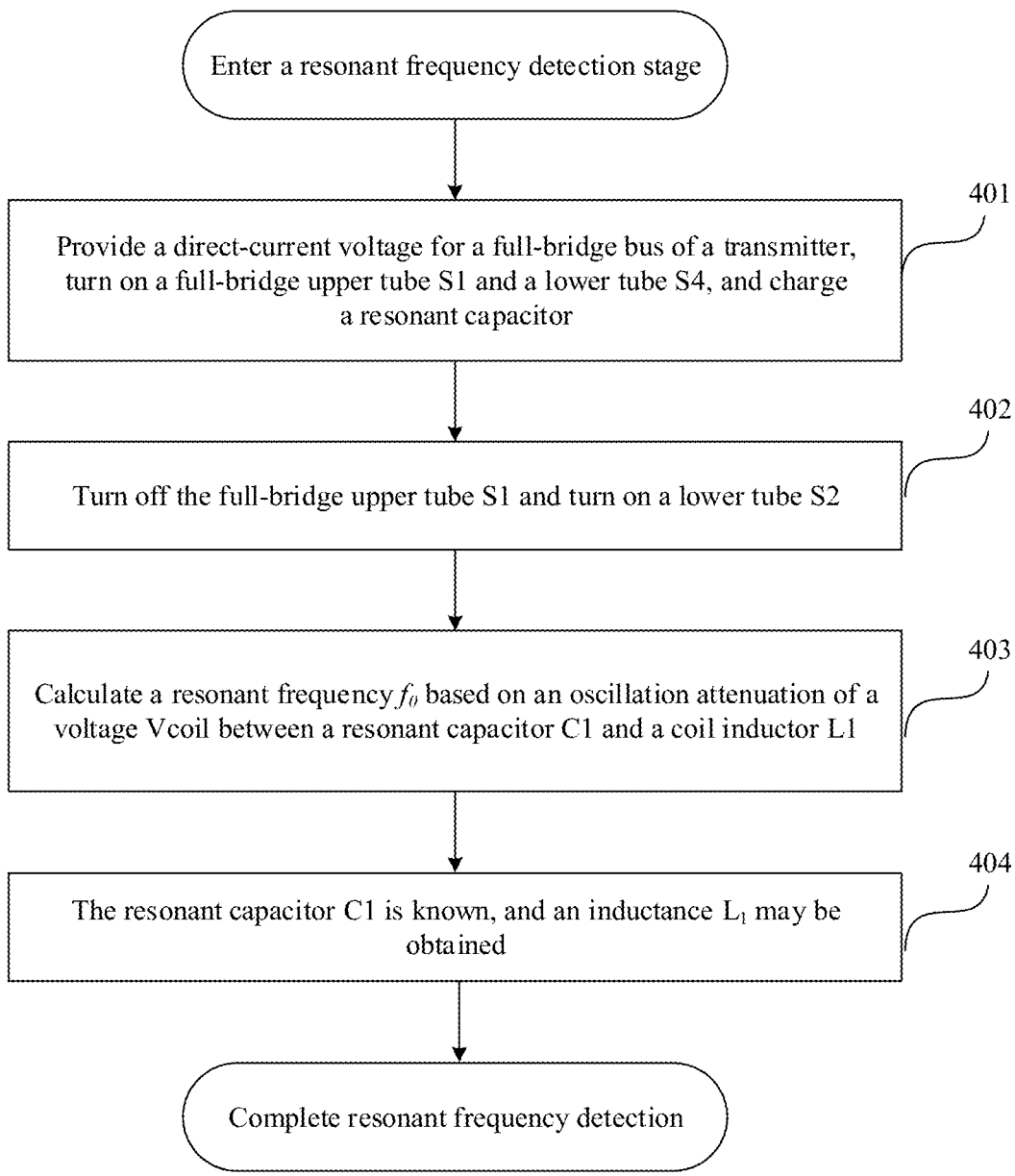

At the energy transmission stage, the processor of the receiver continuously or periodically detects an output voltage of the AC/DC circuit of the receiver, and sends a detected value of the output voltage to the transmitter. The processor of the transmitter calculates a gain value based on the input voltage of the receiver, and determines whether the gain is a preset threshold. If the gain is the preset threshold, no action is performed, and output voltage detection is performed again. If the gain is not the preset threshold, the transmitter controls the operating frequency of the DC/AC circuit to be adjusted within a small range of the operating point, so that a voltage gain reaches the preset threshold. For a schematic flowchart, refer to FIG. 3C.

Figure 8:
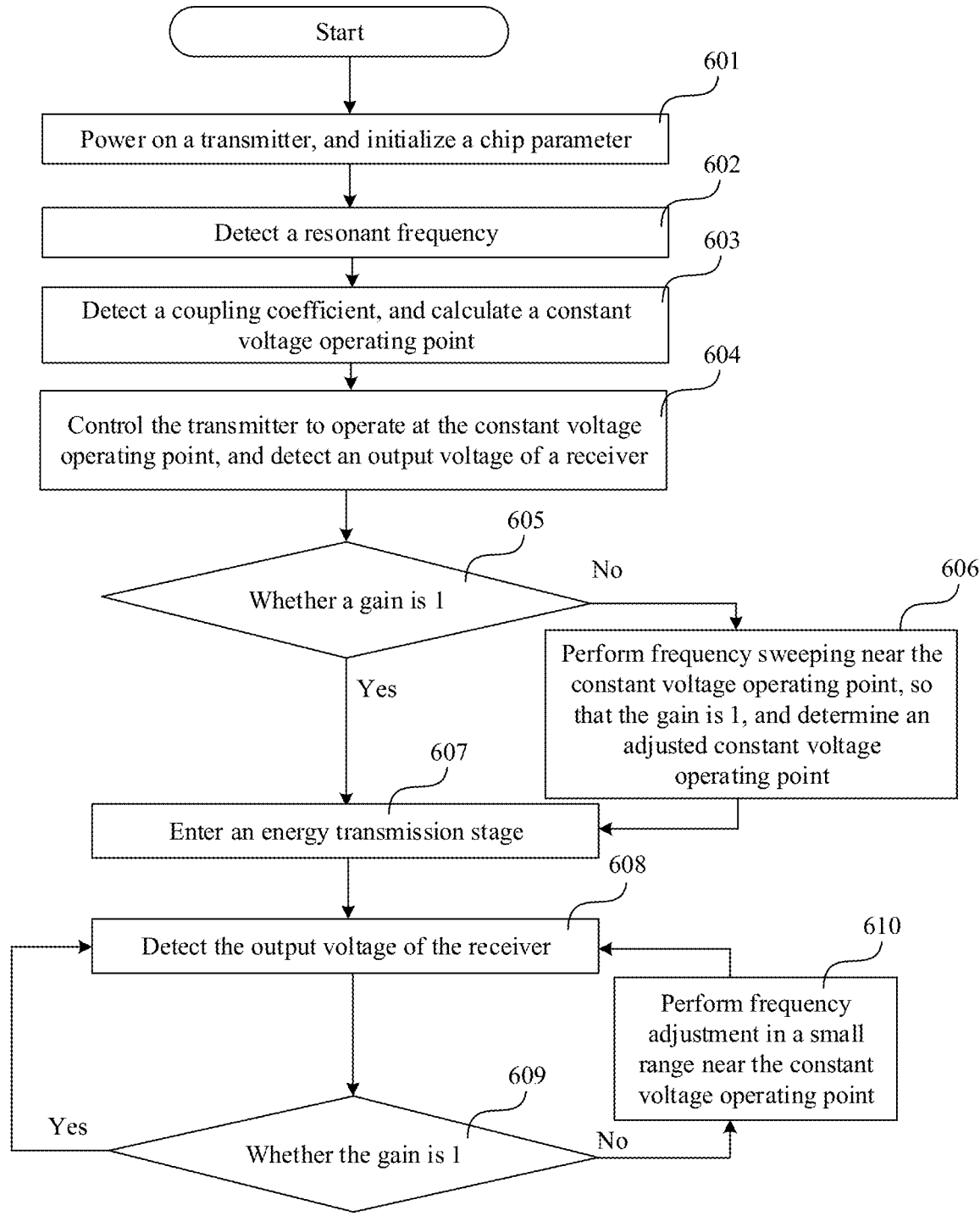
FIG. 8 is a schematic flowchart of a wireless power transmission method according to an embodiment of this application.

In another embodiment, this application provides a wireless power transmission method. The wireless power transmission method is applicable to the wireless power transmission system shown in FIG. 2A-1, FIG. 2B, or FIG. 12. A process of the wireless power transmission method is shown in FIG. 8, and the method includes the following steps.

Step 601: Power on a transmitter, and initialize a chip parameter.

After the transmitter in the wireless power transmission system is powered on, the processor of the transmitter is initialized.

Step 602: Detect a resonant frequency.

For specific steps in which the transmitter detects the resonant frequency, refer to steps 401 to 404. When the receiver keeps the load disconnected, the processor of the transmitter performs control to first charge the capacitor C1 by controlling closing of the switches in the DC/AC circuit 213, and then discharge the power in the capacitor C1 by controlling the closing of the switches in the DC/AC circuit 213. During discharging of the capacitor C1, the processor of the transmitter detects the voltage Vcoil between the capacitor C1 and the inductor L1 of the transmitter, and calculates an oscillation frequency of the voltage Vcoil, to obtain the resonant frequency $f_0$ of the transmitter. Further, the processor of the transmitter obtains a value of the inductor L1 of the transmitter through calculation based on the calculated resonant frequency $f_0$ of the transmitter and the known capacitance C1 of the transmitter.

Step 603: Detect a coupling coefficient, and calculate a constant voltage operating point.

For a specific process of detecting the coupling coefficient, refer to steps 501 to 504.

First, the processor of the transmitter controls the frequency of the alternating current output by the DC/AC circuit 213 of the transmitter to be an operating frequency ω. The processor of the receiver controls the receiver to be in one of a no-load state, a light-load state, or a specific fixed-load state. Next, the processor of the transmitter detects the current $I_1$ passing through the inductor L1 of the transmitter. The power is transferred from the transmitter to the receiver through the inductor L1 and the inductor L2, and the receiver inputs the alternating current transferred through electromagnetic induction between the inductor L1 and the inductor L2 into the rectifier circuit 224 of the receiver, and outputs and provides a direct current to the load of the receiver. The processor of the receiver detects the output voltage $V_{rect}$ of the rectifier circuit, and sends the value of the output voltage $V_{rect}$ to the transmitter. Finally, the processor of the transmitter obtains the coupling coefficient through calculation based on the output voltage $V_{rect}$ sent by the receiver, the inductance L1 of the transmitter, the current $I_1$ detected by the transmitter, and the operating frequency ω of the transmitter.

Further, the processor of the transmitter calculates the constant voltage operating point f based on the calculated resonant frequency $f_0$ of the transmitter and the coupling coefficient k between the transmitter and the receiver and according to formula 1.1.

Step 604: Control the transmitter to operate at the constant voltage operating point, and detect an output voltage of the receiver.

The processor of the transmitter controls the frequency of the alternating current output by the DC/AC circuit 213 of the transmitter to be the value of the constant voltage operating point. In addition, the processor of the receiver detects an output voltage of the rectifier circuit 224 (or the AC/DC circuit 223) of the receiver, and sends a value of the output voltage to the transmitter.

Step 605: Determine whether a gain is 1.

The processor of the transmitter calculates the gain based on a ratio of the output voltage of the receiver to the input voltage of the receiver, and determines whether the gain is 1.

If it is determined that the gain is not 1, step 606 is performed; or if it is determined that the gain is 1, step 607 is performed.

Step 606: Perform frequency sweeping near the constant voltage operating point, so that the gain reaches 1, and determine the adjusted constant voltage operating point.

The processor of the transmitter adjusts the constant voltage operating point based on the calculated value of the constant voltage operating point, and determines the adjusted constant voltage operating point. When the transmitter operates at the constant voltage operating point, a ratio (gain) of the output voltage of the receiver to the input voltage of the receiver is 1.

Step 607: Enter an energy transmission stage.

The processor of the transmitter controls the frequency of the alternating current output by the DC/AC circuit 213 to be the adjusted value of the constant voltage operating point, or the processor controls the frequency of the alternating current output by the DC/AC circuit 213 to be still the value of the constant voltage operating point determined in step 603. Power output by the transmitter is transferred to the receiver through electromagnetic induction between the inductor L1 and the inductor L2. After performing rectification by using the AC/DC circuit, the receiver provides power for the load of the receiver. In this case, the operating frequency of the transmitter is the constant voltage operating frequency. The wireless power transmission system has a constant voltage characteristic, and the output voltage of the receiver is not changed due to a change of the load of the receiver.

Step 608: Detect the output voltage of the receiver.

At the energy transmission stage, the processor of the receiver continuously or periodically detects the output voltage of the AC/DC circuit of the receiver, and sends a detected value of the output voltage to the transmitter.

Step 609: Determine whether the gain is 1.

The processor of the transmitter calculates a gain value based on the output voltage of the receiver and the input voltage of the receiver, and determines whether the gain is 1.

If it is determined that the gain is not 1, step 610 is performed: performing small-range frequency adjustment near the constant voltage operating point. For a specific implementation of adjusting the constant voltage operating point, refer to step 606 and step 303.

If it is determined that the gain is 1, step 608 is performed again.

Figure 9:
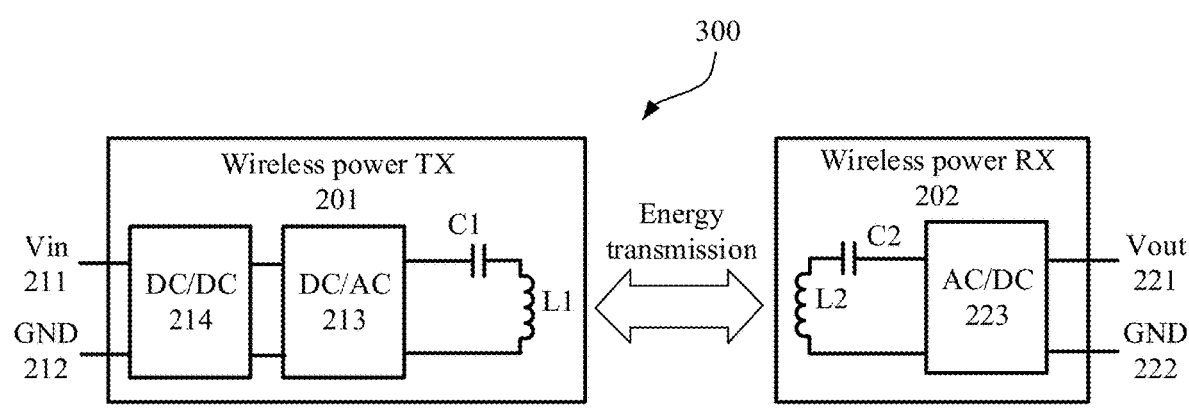
FIG. 9 is a schematic diagram of a structure of a wireless power transmission system according to an embodiment of this application.

An embodiment of this application provides a wireless power transmission system. FIG. 9 is a schematic diagram of a structure of a wireless power transmission system 300. The wireless power transmission system 300 is obtained by adding a DC/DC circuit 214 to the wireless power TX 201 in the wireless power transmission system 200 shown in FIG. 2A-1.

The DC/DC circuit 214 may be located at a pre-stage of the DC/AC circuit 213 (as shown in FIG. 9), or may be located at a next stage of the DC/AC circuit 213. The DC/DC circuit 214, the DC/AC circuit 213, the capacitor C1, and the inductor L1 are connected in series.

Generally, the circuit has a limitation on an operating frequency range. For example, a wireless charging Qi solution has a general operating frequency range of 110 kHz to 148.5 kHz. However, in the wireless power transmission system, the constant voltage operating frequency depends on the inductance L1 of the transmitter, the capacitance C1 of the transmitter, and the coupling coefficient k between the transmitter and the receiver, where the inductance L1 and the coupling coefficient k are affected by a mounting distance between the transmitter and the receiver. Therefore, when the mounting distance between the transmitter and the receiver is changed within a specific range, the constant voltage operating frequency of the system is also changed accordingly, and the constant voltage operating frequency may fall outside the specified operating frequency range.

As shown in FIG. 9, a DC/DC circuit 214 is added based on FIG. 2A-1. When the constant voltage operating frequency finally calculated by the processor of the transmitter exceeds the operating frequency range, the processor of the transmitter adjusts the operating frequency of the DC/AC circuit 213 of the transmitter to an upper limit value or a lower limit value of the operating frequency range closest to the calculated constant voltage operating frequency. The transmitter may further adjust an output voltage of the DC/DC circuit 214, so that the gain value at the energy transmission stage remains equal to 1.

Figure 10:
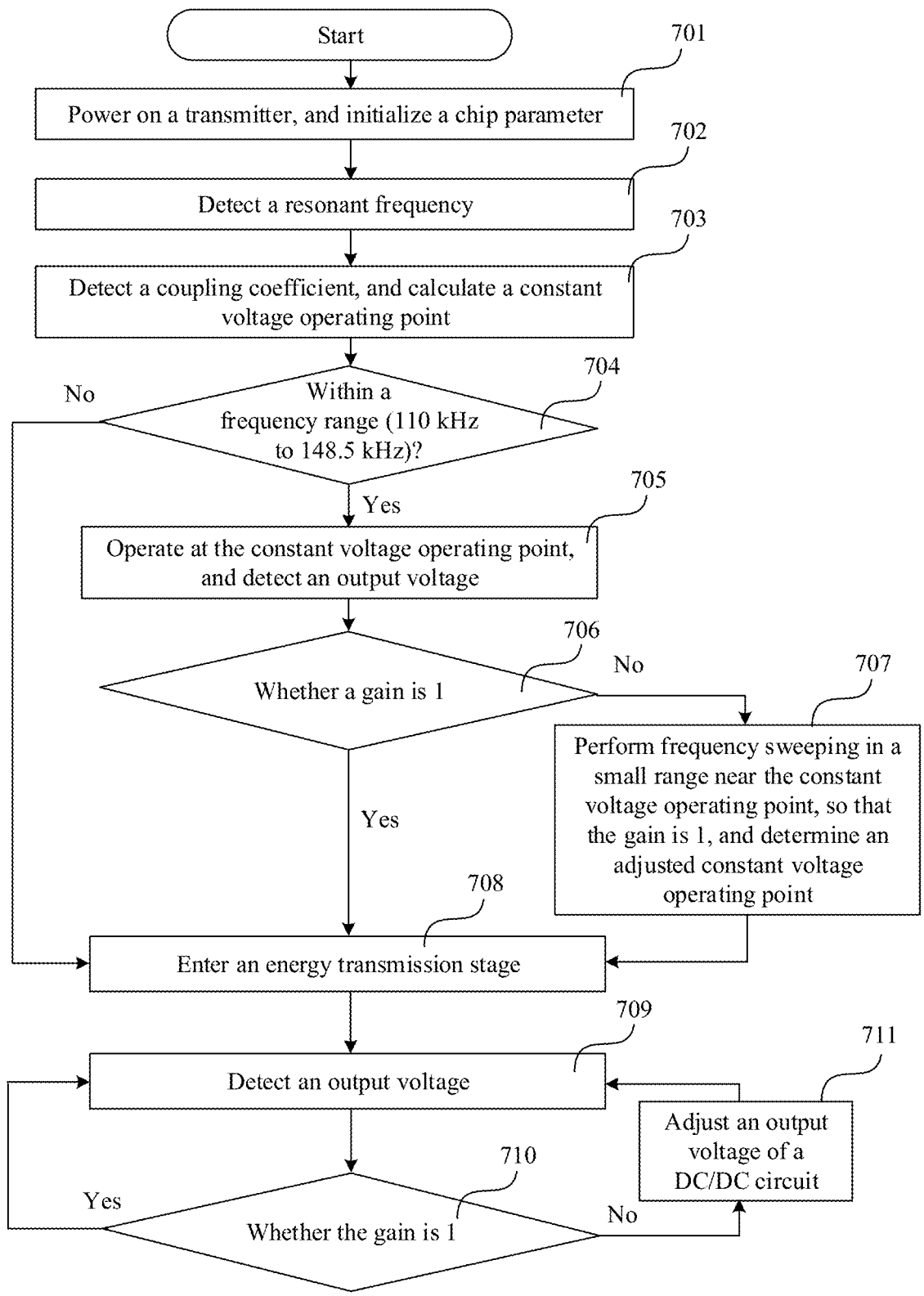
FIG. 10 is a schematic flowchart of a wireless power transmission method according to an embodiment of this application.

This application provides a wireless power transmission method. The wireless power transmission method is applicable to the wireless power transmission system shown in FIG. 2A-1, FIG. 2B, or FIG. 12. A process of the wireless power transmission method is shown in FIG. 10, and the method includes the following steps.

Step 701: Power on a transmitter, and initialize a chip parameter.

After the transmitter in the wireless power transmission system is powered on, the processor of the transmitter is initialized.

Step 702: Detect a resonant frequency.

For specific steps in which the transmitter detects the resonant frequency, refer to steps 401 to 404 or step 602.

Step 703: Detect a coupling coefficient, and calculate a constant voltage operating point.

For a specific process of detecting the coupling coefficient, refer to steps 501 to 504 or step 603.

Step 704: Determine whether the constant voltage operating point is within an operating frequency range of the circuit.

If the constant voltage operating point is within the operating frequency range of the circuit, step 705 is performed. If the constant voltage operating point is not within the operating frequency range of the circuit, step 708 is performed.

Step 705: Control the transmitter to operate at the constant voltage operating point, and detect an output voltage of the receiver.

The processor of the transmitter controls the frequency of the alternating current output by the DC/AC circuit 213 of the transmitter to be the value of the constant voltage operating point. In addition, the processor of the receiver detects an output voltage of the rectifier circuit 224 (or the AC/DC circuit 223) of the receiver, and sends a value of the output voltage to the transmitter.

Step 706: Determine whether a gain is 1.

The processor of the transmitter calculates the gain based on a ratio of the output voltage of the receiver to the input voltage of the receiver, and determines whether the gain is 1.

If it is determined that the gain is not 1, step 707 is performed; or if it is determined that the gain is 1, step 708 is performed.

Step 707: Perform frequency sweeping near the constant voltage operating point, so that the gain reaches 1, and determine the adjusted constant voltage operating point.

The processor of the transmitter adjusts the constant voltage operating point based on the calculated value of the constant voltage operating point, and determines the adjusted constant voltage operating point. When the transmitter operates at the constant voltage operating point, a ratio (gain) of the output voltage of the receiver to the input voltage of the receiver is 1.

Step 708: Enter an energy transmission stage.

If the calculated constant voltage operating point determined in step 704 is not within the operating frequency range of the transmitter, the processor of the transmitter controls the operating frequency of the transmitter to be a minimum value of a difference between the upper limit of the operating frequency range and the calculated constant voltage operating point, and a difference between the lower limit of the operating frequency range and the calculated constant voltage operating point. The transmitter transmits energy between the transmitter and the receiver at this operating frequency. For example, the operating frequency range of the transmitter is 110 kHz to 148.5 kHz, an upper limit value is 148.5 kHz, and a lower limit value is 110 kHz. It is assumed that the calculated value of the constant voltage operating point is 150 kHz, and a calculated difference between the value of the constant voltage operating point and the lower limit is greater than a calculated difference between the value of the constant voltage operating point and the upper limit. Therefore, the processor of the transmitter controls the operating frequency of the transmitter to be the upper limit of the operating frequency range. In this way, the definition of the operating frequency range is satisfied, and the operating frequency of the transmitter can be as close as possible to the calculated constant voltage operating point.

If the gain determined in step 706 is 1, the processor of the transmitter controls the operating frequency of the transmitter to be the calculated value of the constant voltage operating point, that is, controls the frequency of the alternating current output by the DC/AC circuit 213 to be the value of the constant voltage operating point determined in step 703.

If the adjusted constant voltage operating point is determined in step 707, the processor of the transmitter controls the frequency of the alternating current output by the DC/AC circuit 213 to be the value of the adjusted constant voltage operating point.

During energy transmission, power output by the transmitter is transferred to the receiver through electromagnetic induction between the inductor L1 and the inductor L2. After performing rectification by using the AC/DC circuit, the receiver provides the power for the load of the receiver. In this case, the operating frequency of the transmitter is the constant voltage operating frequency. The wireless power transmission system has a constant voltage characteristic, and the output voltage of the receiver is not changed due to a change of the load of the receiver.

Step 709: Detect the output voltage of the receiver.

At the energy transmission stage, the processor of the receiver continuously or periodically detects the output voltage of the AC/DC rectifier circuit of the receiver, and sends a detected value of the output voltage to the transmitter.

Step 710: Determine whether the gain is 1.

The processor of the transmitter calculates a gain value based on the output voltage of the receiver and the input voltage of the receiver, and determines whether the gain is 1.

If it is determined that the gain is not 1, step 711 is performed; or if it is determined that the gain is 1, step 709 is performed again.

Step 711: Adjust an output voltage of a DC/DC circuit.

The processor of the transmitter adjusts the output voltage of the DC/DC circuit 214 until the gain is 1.

Figure 11:
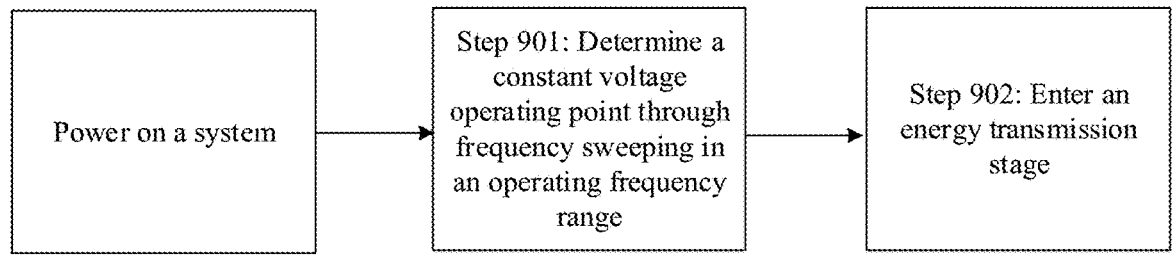
FIG. 11 is a schematic flowchart of a wireless power transmission method according to an embodiment of this application.

An embodiment of this application further provides a wireless power transmission method. The wireless power transmission method is applicable to the wireless power transmission system shown in FIG. 2A-1, FIG. 2B, or FIG. 12. A flowchart is shown in FIG. 11.

Step 901: Perform frequency sweeping in an operating frequency range of a DC/AC inverter circuit, and determine a constant voltage operating point of a transmitter by detecting an input voltage of the DC/AC inverter circuit and an output voltage of an AC/DC rectifier circuit.

When a ratio of an input voltage of a DC/AC inverter circuit to an output voltage of an AC/DC rectifier circuit reaches a preset threshold, an actual operating frequency of the DC/AC inverter circuit is a constant voltage output operating frequency determined through frequency sweeping, that is, the constant voltage operating point.

Optionally, after the constant voltage operating point is determined, and if the determined constant voltage operating frequency is at or exceeds an upper limit of an operating frequency range of the DC/AC circuit, in an implementation, the DC/AC circuit can be controlled to operate at an upper limit of the operating frequency, and a duty cycle can be adjusted, so that the system covers a larger distance range. In another implementation, a pre-stage DC/DC circuit is added to the transmitter or a next-stage DC/DC circuit is added to the receiver, so that the system covers a larger distance range. The determined constant voltage operating frequency may be the calculated constant voltage operating frequency, or may be an operating frequency obtained after adjustment is performed based on the calculated constant voltage operating frequency, that is, the adjusted constant voltage operating frequency.

Optionally, considering impact of the change of the load of the receiver on the gain of the system, an actual operating frequency of the DC/AC inverter circuit is adjusted within a specific range of the determined constant voltage operating frequency, and the processor of the transmitter controls the DC/AC inverter circuit to adjust the actual operating frequency within a small range of the determined constant voltage operating frequency. A frequency adjustment range enables a gain range of the wireless power transmission system to be in a range of a gain threshold, for example, in a range of 1 to 2 (which may include two endpoint values of 1 and 2). A frequency range (fmin2, fmax2) of small-range frequency adjustment is determined, where the range of the small-range frequency adjustment is a sub-interval of an operating frequency range (fmin1, fmax1) of the DC/AC inverter circuit. There are two methods of determining the frequency range of the small-range frequency adjustment. One method is that the frequency range of the small-range frequency adjustment is calculated based on the operating point determined in step 303 and according to a predetermined algorithm. The other method is that the frequency range of the small-range frequency adjustment is obtained through the small-range frequency sweeping mentioned in step 303.

Optionally, after the frequency range of the small-range frequency adjustment is determined, and if the determined frequency range fmax2 of the small-range frequency adjustment is at or exceeds the upper limit of the operating frequency range of the DC/AC circuit, in an implementation, when the DC/AC circuit can be controlled to operate at the upper limit of the operating frequency, a duty cycle can be adjusted, so that the system covers a larger distance range.

Step 902: Enter an energy transmission stage.

For a specific description of this step, refer to step 304.

At the energy transmission stage, the processor of the receiver continuously or periodically detects an output voltage of the AC/DC circuit of the receiver, and sends a detected value of the output voltage to the transmitter. The processor of the transmitter calculates a gain value based on the input voltage of the receiver, and determines whether the gain is a preset threshold. If the gain is the preset threshold, no action is performed, and output voltage detection is performed again. If the gain is not the preset threshold, the transmitter controls the operating frequency of the DC/AC circuit to be adjusted within a small range of the operating point, so that a voltage gain reaches the preset threshold. For a schematic flowchart, refer to FIG. 3C.

In an embodiment, in addition to the resonant frequency $f_0$ and the coupling coefficient k, a relative position between the transmitter and the receiver can be further obtained by using parameters such as system efficiency, a current of a transmitting coil, and a voltage of the receiver. Therefore, the constant voltage operating frequency is calculated based on a correspondence between the relative position and the constant voltage operating frequency. The parameters that can be used to calculate the relative position between the transmitter and the receiver may be at least one of the following:

the system efficiency of the wireless power transmission system, the output voltage of the AC/DC rectifier circuit of the receiver, the current on the inductor L1 of the transmitter, a self-inductance of the inductor L1 of the transmitter, a self-inductance of the inductor L2 of the receiver, a mutual inductance between the inductor L1 and the inductor L2, or the coupling coefficient between the inductor L1 and the inductor L2.

This embodiment provides a wireless power transmission system, where the system includes a transmitter and a receiver. The transmitter includes at least a DC/AC inverter circuit, a first inductor L1, and a first capacitor C1. The receiver includes at least an AC/DC rectifier circuit, a second inductor L2, and a second capacitor C2. Power at the transmitter is transmitted to the receiver through electromagnetic induction between the first inductor and the second inductor, and the AC/DC rectifier circuit is configured to provide the rectified power to a load of the receiver. The inductor L1 and the capacitor C1 can be connected in series, or can be connected in parallel. The inductor L2 and the first capacitor C2 can be connected in series, or can be connected in parallel. For a diagram of a structure of the wireless power transmission system, refer to FIG. 2A-1, FIG. 2B, or FIG. 12.

One or more of the parameters that can be used to calculate the relative position between the transmitter and the receiver is detected, and the relative position between the receiver and the transmitter is determined based on a stored correspondence between a combination of the one or more parameters and the relative position; and the value of the constant voltage operating point is determined based on a stored correspondence between the relative position and the constant voltage operating point. Both the correspondence between the combination of the one or more parameters and the relative position and the correspondence between the relative position and the constant voltage operating point are obtained in advance through measurement and stored in the system.

Optionally, as shown in FIG. 2A-2, there is a function relationship between a coil inductance and a relative position. The coil inductance (the self-inductance of the inductor L1 of the transmitter or the self-inductance of the inductor L2 of the receiver or the mutual inductance between the inductor L1 and the inductor L2) is detected, and the relative position between the receiver and the transmitter is determined based on the stored correspondence between the coil inductance and the relative position; and the value of the constant voltage operating point is determined based on the stored correspondence between the relative position and the constant voltage operating point. Both the correspondence between the coil inductance and the relative position and the correspondence between the relative position and the constant voltage operating point are obtained in advance through measurement.

Optionally, as shown in FIG. 2A-3, there is a function relationship between a coupling coefficient and a relative position. A coupling coefficient between the transmitter and the receiver is detected, and a relative position between the receiver and the transmitter is determined based on a stored correspondence between the coupling coefficient and the relative position; and the value of the constant voltage operating point is determined based on the stored correspondence between the relative position and the constant voltage operating point. Both the correspondence between the coupling coefficient and the relative position and the correspondence between the relative position and the constant voltage operating point are obtained in advance through measurement. For a calculation method of the coupling coefficient, refer to steps 501 to 505 shown in FIG. 7.

Optionally, as shown in FIG. 2A-4, there is a function relationship between a current of a transmitting coil and a relative position. A current of a transmitting coil is detected, and a relative position between the receiver and the transmitter is determined based on a stored correspondence between the current of the transmitting coil and the relative position; and the value of the constant voltage operating point is determined based on the stored correspondence between the relative position and the constant voltage operating point. Both the correspondence between the current of the transmitting coil and the relative position and the correspondence between the relative position and the constant voltage operating point are obtained in advance through measurement.

Optionally, as shown in FIG. 2A-5, there is a function relationship between efficiency of the wireless power transmission system and a relative position. Efficiency of the wireless power transmission system is detected, and a relative position between the receiver and the transmitter is determined based on a stored correspondence between the efficiency of the wireless power transmission system and the relative position; and the value of the constant voltage operating point is determined based on the stored correspondence between the relative position and the constant voltage operating point. Both the correspondence between the efficiency of the wireless power transmission system and the relative position and the correspondence between the relative position and the constant voltage operating point are obtained in advance through measurement.

Optionally, there is a function relationship between an output voltage of a rectifier circuit and a relative position. An output voltage of a rectifier circuit is detected, and a relative position between the receiver and the transmitter is determined based on a stored correspondence between the output voltage of the rectifier circuit and the relative position; and the value of the constant voltage operating point is determined based on the stored correspondence between the relative position and the constant voltage operating point. Both the correspondence between the output voltage of the rectifier circuit and the relative position and the correspondence between the relative position and the constant voltage operating point are obtained in advance through measurement.

The constant voltage operating frequency depends on the inductance L1, the resonant capacitance C1, and the coupling coefficient k, where the inductance L1 and the coupling coefficient k are affected by a mounting distance between the transmitter and the receiver.

Therefore, when a relative mounting distance between the transmitter and the receiver is changed within a specific range, a constant voltage operating frequency of a wireless power supply system is also changed accordingly. Operation in a specific frequency range is usually recommended for reasons of coil transmission efficiency and an electromagnetic compatibility (EMC) standard. According to a limitation of the Harmonized European Standard of the European Telecommunications Standards Institute (ETSI) on a magnetic field intensity H, an upper limit of the magnetic field intensity H detected at a distance of 10 m for a circuit with an operating frequency range of 140 kHz to 148.5 kHz is 37.7 dBuA/m, and an upper limit of the magnetic field intensity H detected at a distance of 10 m for a circuit with an operating frequency range of 148.5 kHz to 300 kHz is −5 dBuA/m. Therefore, generally, an upper limit of an operating frequency of a kilohertz wireless power supply system is below 148.5 kHz. An operating frequency range of the existing solution is generally between 110 kHz and 148.5 kHz. When the wireless power supply system provided in this embodiment of this application operates at a constant voltage operating frequency, considering a limitation of an operating frequency range, one stage of DC/DC circuit is added to adapt to a change of a constant voltage operating frequency caused by a change of a relative distance between the transmitter and the receiver.

Figure 12:
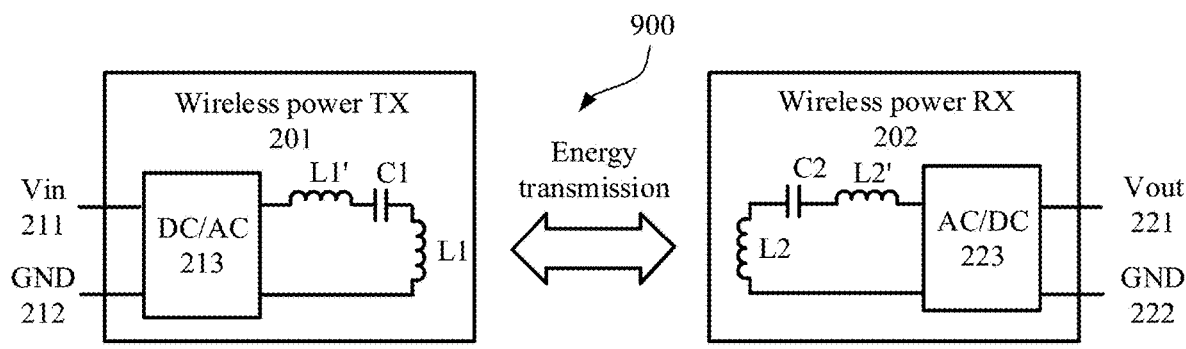
FIG. 12 is a schematic diagram of a structure of a wireless power transmission system according to an embodiment of this application.

In another embodiment, this application provides a wireless power supply system. The wireless power supply system 900 shown in FIG. 12 is obtained by separately adding a compensation inductor to the receiver and the transmitter on the basis of the wireless power transmission system 200 in FIG. 2A-1.

A wireless power transmitter TX 201 in the wireless power supply system 900 is a wireless power supply unit 101 of an indoor unit, and a wireless power receiver RX 202 in the wireless power transmission system 200 is a wireless power reception unit 103 of an outdoor unit. Energy transmission between the transmitter TX 201 and the receiver RX 202 is implemented through electromagnetic induction between an inductor L1 and an inductor L2.

The wireless power transmitter TX 201 includes a resonant circuit formed by connecting a direct current/alternating current (DC/AC) inverter circuit 213, a capacitor C1, an inductor L1, and a compensation inductor L1' in series, where the DC/AC inverter circuit 213 may use a half-bridge or full-bridge topology. One end 211 of the wireless power TX 201 can be connected to a load (for example, the load 102 in FIG. 1) and then connected to a power supply; or one end 211 of the wireless power TX 201 can be directly connected to a power supply. Vin represents an input voltage of the wireless power TX and GND 212 represents a wire ground.

The wireless power receiver RX 202 includes a resonant circuit formed by connecting an alternating current/direct current (AC/DC) rectifier circuit 223, a capacitor C2, an inductor L2, and a compensation inductor L2' in series. The AC/DC rectifier circuit may use a half-bridge or full-bridge topology and may be rectified in a synchronization manner or a diode manner. One end 221 of the wireless power RX 202 can be connected to a load (for example, the load 104 in FIG. 1). Vout represents an output voltage of the wireless power RX and GND represents a wire ground.

The wireless power TX 201 includes the DC/AC circuit 213, the capacitor C1, the inductor L1, and the compensation inductor L1', where the DC/AC circuit 213 is connected to the capacitor C1 and the inductor L1 in series. In order to distinguish the inductor L1 from the compensation inductor L1', the inductor L1 may be referred to as a first resonant inductor.

The wireless power RX 202 includes the AC/DC circuit 223, the capacitor C2, the inductor L2, and the compensation inductor L2', where the AC/DC circuit 223 is connected to the capacitor C2 and the inductor L2 in series. In order to distinguish the inductor L2 from the compensation inductor L2', the inductor L2 may be referred to as a second resonant inductor.

Considering a limitation of an operating frequency range of the DC/AC circuit, during circuit design, values of the resonant capacitors C1 and C2 and the compensation inductors L1' and L2' may be designed based on an expected operating frequency range ($f_{min}$, $f_{max}$), a change range ($L_{min}$, $L_{max}$) of the inductor L1 caused by a change of a relative mounting distance between the transmitter and the receiver, and a range ($k_{min}$, $k_{max}$) of a coupling coefficient, so that when the relative mounting distance between the transmitter and the receiver is changed, the constant voltage operating frequency can fall within a specified operating frequency range. In this embodiment of this application, compensation inductors, that is, L1' and L2', are respectively added to a primary side and a secondary side, so that the added one stage of DC/DC circuit is omitted.

Values of the newly added inductor L1' and the resonant capacitor C1 can be obtained based on the range ($f_{min}$, $f_{max}$) of the operating frequency and the range ($k_{min}$, $f_{max}$) of the coupling coefficient.

$$L1' = \frac{f_{min}^2}{f_{max}^2 - f_{min}^2}\left[\frac{f_{max}^2}{f_{min}^2}(k_{max}L_{max} - L_{max}) + L_{min} - k_{min}L_{min}\right]$$

$$C1 = \frac{1}{\omega_{min}^2(L1' + L_{min} - k_{min}L_{min})}$$

where $\omega_{min}$ represents an angular velocity corresponding to a minimum operating frequency of the transmitter;

$f_{min}$ represents a lower limit value of the operating frequency of the DC/AC circuit; and $f_{max}$ represents an upper limit value of the operating frequency of the DC/AC circuit; and $k_{min}$ represents a lower limit value of the coupling coefficient and $k_{max}$ represents an upper limit value of the coupling coefficient, and the two limit values of the coupling coefficient are obtained through pre-testing. For example, in an actual scenario, a change range of a distance between a wireless power TX and a wireless power RX or a change range of a distance between an inductor L1 and an inductor L2 is tested. A change range of a coupling coefficient corresponding to the change range of the distance is between an upper limit and a lower limit of the coupling coefficient.

$L_{min}$ and $L_{max}$ represent preset lower and upper limit values. As shown in FIG. 12, if the distance between the inductor L1 and the inductor L2 is changed, mutual inductance occurs between the inductor L1 and the inductor L2, and an actual value of the inductor L1 changes with a change of the distance. Therefore, upper limits and lower limits of the actual inductance values of the inductor L1 at different distances can be obtained through measurement, that is, $L_{min}$ and $L_{max}$ are obtained.

Figure 13:
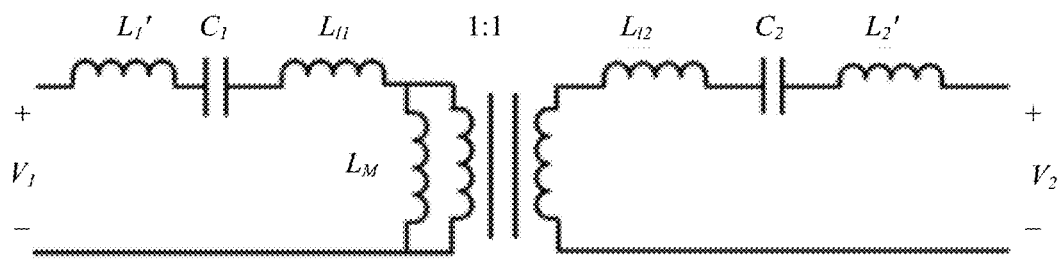
FIG. 13 is an equivalent circuit model of a wireless power transmission system according to an embodiment of this application.

FIG. 13 is an equivalent circuit model of FIG. 12. The DC/AC circuit 213 and the AC/DC circuit 223 in FIG. 12 are omitted in FIG. 13. $L_{f1}$ and $L_{f2}$ respectively represent leakage inductances of the transmitter and the receiver, $L_M$ represents a mutual inductance coil with refraction at a primary edge, and 1:1 represents an ideal transformer.

When a sum of reactances of the leakage inductance $L_{f1}$, the resonant capacitor C1, and the compensation inductor L1' of the transmitter and a sum of reactances of the leakage inductance $L_{f2}$, the resonant capacitor C2, and the compensation inductor L2' of the receiver are separately zero, that is, $$j\omega L1' + j\omega L_{f1} + \frac{1}{j\omega C1} = 0$$

$$j\omega L2' + j\omega L_{f2} + \frac{1}{j\omega C2} = 0$$

where j represents an imaginary number; represents an angular velocity corresponding to the operating frequency of the transmitter.

In this case, a relationship between the input voltage $V_1$ of the transmitter and the output voltage $V_2$ of the receiver is as follows:

$$V_1 = V_2.$$

The output voltage $V_2$ is related to only the input voltage $V_1$ and is unrelated to the load of the receiver. Therefore, the operating frequency $\omega$ that enables the sum of the reactances of the leakage inductance $L_{f1}$, the resonant capacitor C1, and the compensation inductor L1' of the transmitter and the sum of the reactances of the leakage inductance $L_{f2}$, the resonant capacitor C2, and the compensation inductor L2' of the receiver to be separately zero is the constant voltage operating frequency f. When the wireless power supply system operates at a constant voltage operating frequency, the output voltage of the receiver is not changed with a change of the load of the receiver, and has a stable output characteristic. In an actual system, considering a common difference between a resistance and a capacitance and a resistance of a coil, an actual constant voltage operating frequency may need to be adjusted in a small range near the calculated constant voltage operating frequency.

Figure 14:
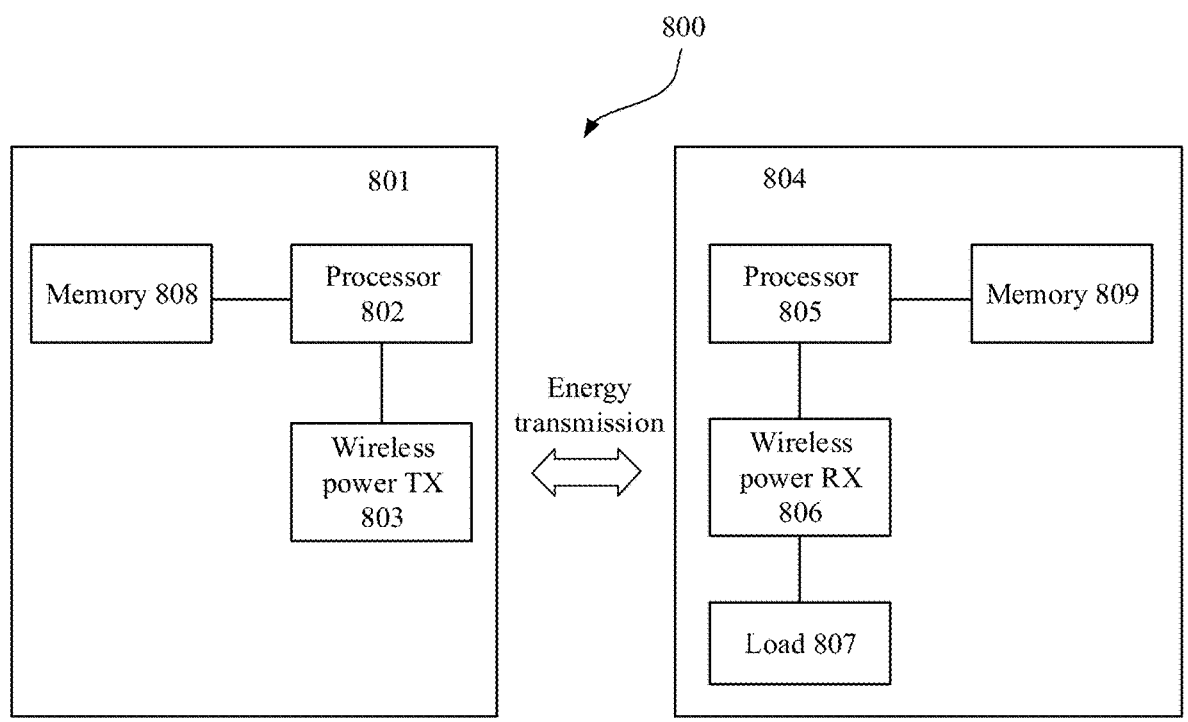
FIG. 14 is a schematic diagram of a structure of a wireless power transmission system according to an embodiment of this application.

FIG. 14 is a schematic diagram of a structure of a wireless power transmission system 800 according to an embodiment of this application. The CPE includes the wireless power transmission system 800.

In an implementation, a unit 801 in the wireless power transmission system 800 may be an indoor unit in the CPE, and a unit 804 may be an outdoor unit in the CPE. In another implementation, the unit 801 in the wireless power transmission system 800 may be the outdoor unit in the CPE, and the unit 804 may be the indoor unit in the CPE.

For example, in the wireless power transmission system 800, the unit 801 is the indoor unit in the CPE and the unit 804 is the outdoor unit in the CPE. The indoor unit 801 may include a wireless power transmitter TX 803 and a processor 802, and may further include a memory 808. The processor 802 is connected to the wireless power transmitter 803. The outdoor unit 804 may include a wireless power receiver RX 806 and a processor 805. The processor 805 is connected to the wireless power receiver 806. The outdoor unit 804 may further include a load 807, and may further include a memory 809. Energy transmission between the indoor unit 801 and the outdoor unit 804 is implemented through electromagnetic induction between the wireless power TX 803 and the wireless power RX 806. Structures of the wireless power TX 803 and the wireless power RX 806 may be any structure provided in embodiments of this application.

The processor 802 is the processor of the transmitter mentioned in the foregoing embodiments, and may be configured to calculate a constant voltage operating frequency of the wireless power TX 803, and control the wireless power TX 803 to operate at the constant voltage operating frequency, so that the wireless power TX 803 and the wireless power RX 806 have constant voltage output characteristics, and a voltage output by the wireless power RX 806 is not affected by the load 807.

The processor 805 is the processor of the receiver mentioned in the foregoing embodiments, and may be configured to detect an output voltage and a gain of the wireless power RX 806, and feed back the output voltage and the gain to the wireless power transmitter TX 803 for calculating the constant voltage operating frequency.

Optionally, the processor 802 may be a part of the wireless power transmitter 803, or may be a component independent of the wireless power transmitter 803.

Optionally, the processor 805 may be a part of the wireless power transmitter 803, or may be a component independent of the wireless power transmitter 803.

Optionally, the processor 802 and the processor 805 may be alternatively located on another processing device independent of the unit 801 and the unit 804. In other words, the system 800 may further include the processing device.

The processor 802 or 805 may be a central processing unit (CPU), and the processor may be alternatively another general-purpose processor, a digital signal processor (DSP), an application-specific integrated circuit (ASIC), a field-programmable gate array (FPGA) or another programmable logic device, a discrete gate or a transistor logic device, or a discrete hardware component. The general-purpose processor may be a microprocessor, or the processor may be any conventional processor, or the like.

The memory 808 stores a computer program. The processor 802 may be configured to execute the computer program in the corresponding memory 808, to implement the steps performed by the transmitter in the foregoing embodiments. The memory 808 is a non-volatile storage medium, and generally includes an internal storage and an external storage. The internal storage includes but is not limited to a random access memory (RAM), a read-only memory (ROM), a cache, or the like. The external storage includes but is not limited to a flash memory, a hard disk, a compact disc, a universal serial bus (USB) flash drive, and the like. The computer program is usually stored in the external storage. Before executing the computer program, the processor loads the program from the external storage to the internal storage. The memory 808 may be standalone and connected to the processor 802 by using a bus; or the memory 808 and the processor 802 may be integrated into one chip subsystem.

The memory 809 is similar to the memory 808. The processor 805 may be configured to execute the computer program in the corresponding memory 809, to implement the steps performed by the receiver in the foregoing embodiments. The memory 809 may be standalone and connected to the processor 805 by using a bus; or the memory 809 and the processor 805 may be integrated into one chip subsystem.

It should be noted that, division into modules and units provided in the foregoing embodiments is merely used as an example, and the described functions of the modules are merely examples for description. This application is not limited thereto. A person of ordinary skill in the art may combine functions of two or more of the modules as required, or split functions of one module to obtain more modules with a finer granularity, or use another transformation manner.

Same or similar parts between the embodiments described above may be cross-referenced. Unless otherwise specified, "a plurality of" in this application means two or more, or "at least two". "A/B" in this application includes three cases: "A", "B", and "A and B".

The described apparatus embodiment is merely an example. The modules described as separate parts may or may not be physically separate, and parts displayed as modules may or may not be physical modules, may be located in one position, or may be distributed on a plurality of network modules. Some or all the modules may be selected based on an actual requirement to achieve the objectives of the solutions of the embodiments. In addition, in the accompanying drawings of the apparatus embodiments provided in this application, connection relationships between modules indicate that the modules have communication connections with each other, which may be specifically implemented as one or more communication buses or signal cables. A person of ordinary skill in the art may understand and implement the embodiments without creative efforts.

The foregoing descriptions are merely some specific embodiments of this application, but are not intended to limit the protection scope of this application.

What is claimed is:

1. A wireless power transmission method comprising:
   detecting a resonant frequency $f_0$ of a transmitter, and calculating an inductance value of a transmitting coil L1 of the transmitter;
   detecting a coupling coefficient k between the transmitter and a receiver;
   determining an operating point by either of the transmitter or the receiver; and
   transmitting power from the transmitter to the receiver using electromagnetic induction at a frequency maintained at the operating point.

2. The wireless power transmission method of claim 1, wherein detecting the $f_0$ of the transmitter comprises determining an oscillation attenuation of a voltage between a capacitor and an inductor of the transmitter.

3. The wireless power transmission method of claim 2, wherein a value of the capacitor is known, and a value of the inductor is calculated based on the $f_0$.

4. The wireless power transmission method of claim 1, wherein detecting k is based at least on an output voltage of a rectifier circuit of the receiver in a no-load state.

5. The wireless power transmission method of claim 1, wherein the operating point is determined according to the formula $$f = \frac{f_o}{\sqrt{1-k}}.$$

* * * * *